United States Patent
Kahn et al.

(10) Patent No.: US 6,563,550 B1
(45) Date of Patent: May 13, 2003

(54) DETECTION OF PROGRESSIVE FRAMES IN A VIDEO FIELD SEQUENCE

(75) Inventors: Barry A. Kahn, Orlando, FL (US); Albert R. Sanders, Orlando, FL (US)

(73) Assignee: Teranex, Inc., Orlando, FL (US)

( * ) Notice: Subject to any disclaimer, the term of this patent is extended or adjusted under 35 U.S.C. 154(b) by 0 days.

(21) Appl. No.: 09/517,090

(22) Filed: Mar. 6, 2000

(51) Int. Cl.$^7$ .............................. H04N 5/14; H04N 7/01; H04N 11/20

(52) U.S. Cl. ................... 348/700; 348/449; 348/452; 348/558

(58) Field of Search .................... 348/451, 452, 348/459, 554, 555, 556, 558, 699, 700, 701, 449; H04N 3/27, 5/14, 5/46, 7/01, 9/64, 11/20

(56) References Cited

U.S. PATENT DOCUMENTS

| | | | | |
|---|---|---|---|---|
| 5,317,398 A | * | 5/1994 | Casavant et al. | 348/570 |
| 5,398,071 A | * | 3/1995 | Gove et al. | 348/558 |
| 5,406,333 A | * | 4/1995 | Martin | 348/449 |
| 5,452,011 A | * | 9/1995 | Martin et al. | 348/526 |
| 5,508,750 A | * | 4/1996 | Hewlett et al. | 348/558 |
| 5,517,248 A | * | 5/1996 | Isoda | 348/459 |
| 5,563,651 A | * | 10/1996 | Christopher et al. | 348/97 |
| 5,600,376 A | * | 2/1997 | Casavant et al. | 348/423 |
| 5,606,373 A | * | 2/1997 | Dopp et al. | 348/459 |
| 5,689,301 A | * | 11/1997 | Christopher et al. | 348/97 |
| 5,828,786 A | * | 10/1998 | Rao et al. | 382/236 |
| 5,835,163 A | * | 11/1998 | Liou et al. | 348/700 |
| 5,852,473 A | * | 12/1998 | Horne et al. | 348/558 |
| 5,864,368 A | * | 1/1999 | Kato et al. | 348/446 |
| 5,872,600 A | * | 2/1999 | Suzuki | 348/459 |
| 5,929,902 A | * | 7/1999 | Kwok | 348/700 |
| 6,014,182 A | * | 1/2000 | Swartz | 348/700 |
| 6,055,018 A | * | 4/2000 | Swan | 348/448 |
| 6,058,140 A | * | 5/2000 | Smolenski | 375/240 |
| 6,148,035 A | * | 11/2000 | Oishi et al. | 375/240.6 |
| 6,154,257 A | * | 11/2000 | Honda et al. | 348/558 |
| 6,157,412 A | * | 12/2000 | Westerman et al. | 348/558 |
| 6,167,088 A | * | 12/2000 | Sethuraman | 375/240.1 |
| 6,205,177 B1 | * | 3/2001 | Girod et al. | 375/240.14 |
| 6,236,806 B1 | * | 5/2001 | Kojima et al. | 386/131 |

* cited by examiner

Primary Examiner—John Miller
Assistant Examiner—Brian Yenke

(57) ABSTRACT

A progressive video frame is detected in a sequence of video fields, wherein the sequence of video fields includes a target video field. Detection includes generating one or more metrics by comparing the target video field with an immediately preceding and/or immediately succeeding video field. The metrics are compared with one or more threshold values. The immediately preceding and/or immediately succeeding video field is determined to have been derived from a same progressive video frame as the target video field if the one or more metrics are less than their respective threshold values. The metrics in this case may be indicative of a quantity of interlace artifacts. Alternatively, metrics indicative of an amount of represented motion may be derived by comparing a target video field with each of an immediately preceding and immediately succeeding video field. The relative values of the metrics with respect to one another is then used to indicate whether one or both of the immediately preceding and immediately succeeding video fields is a progressive match for the target video field.

36 Claims, 11 Drawing Sheets

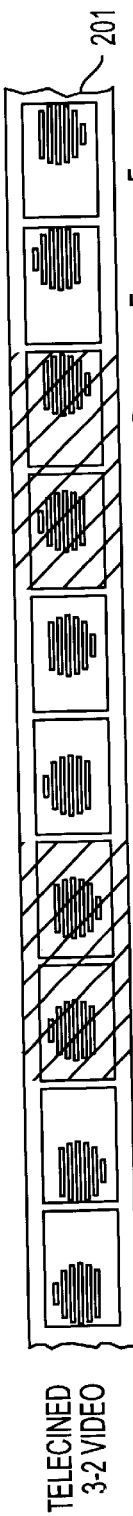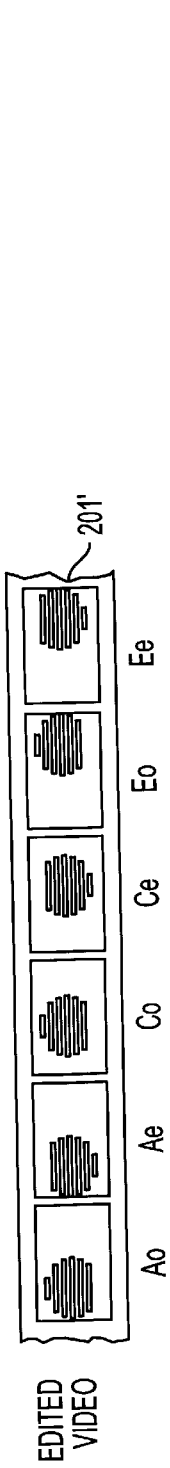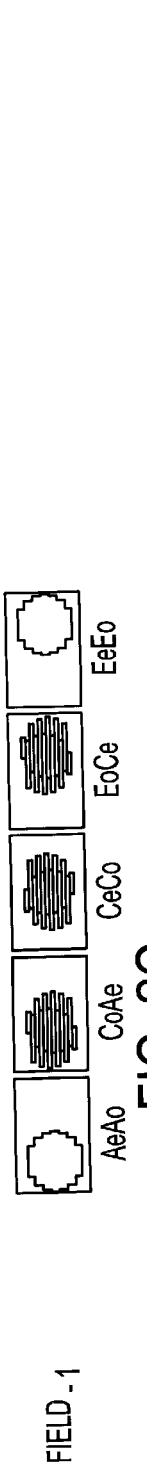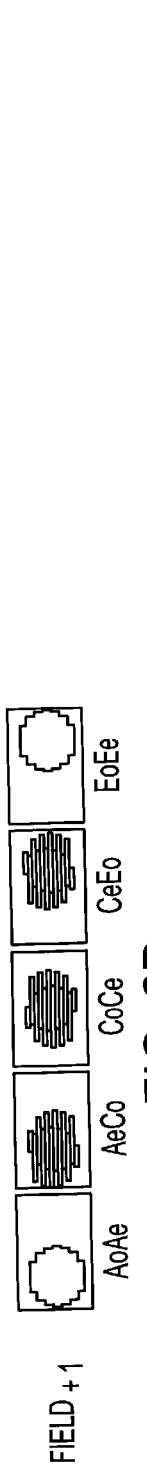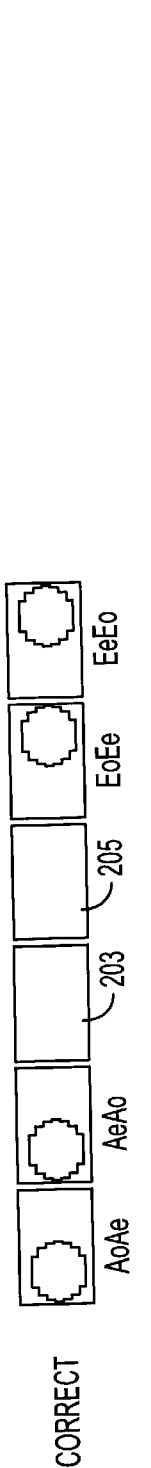

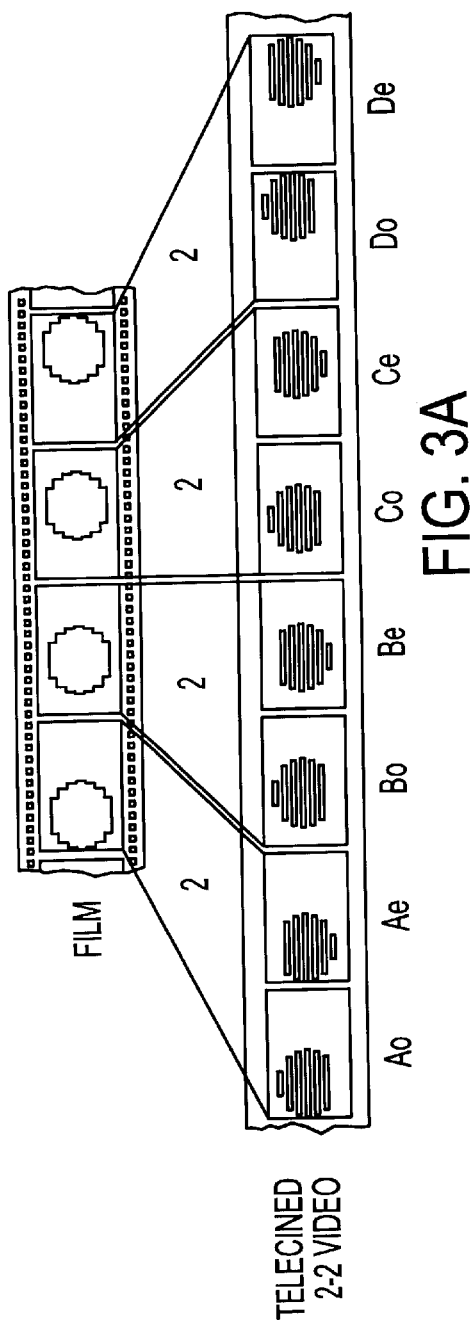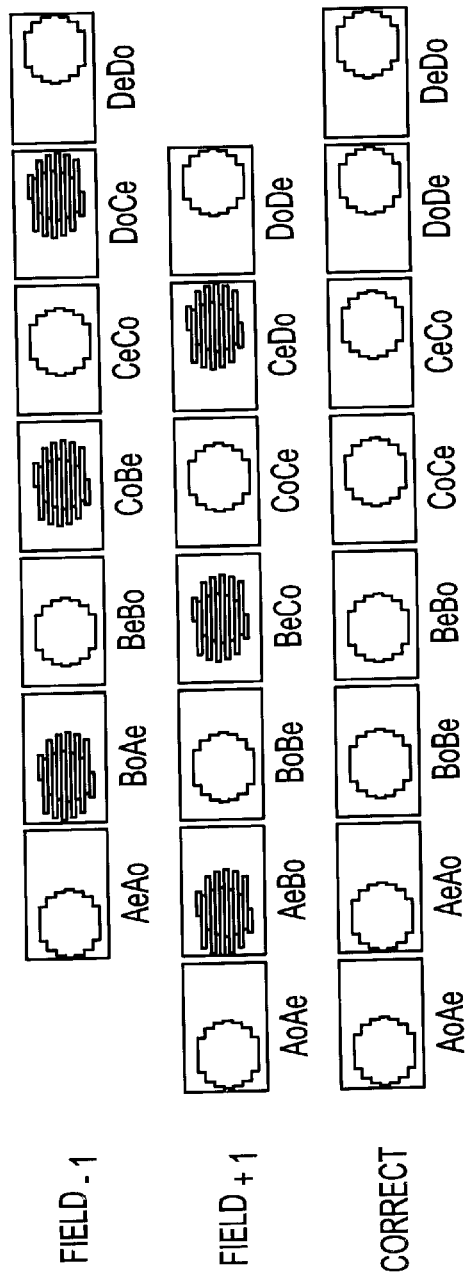

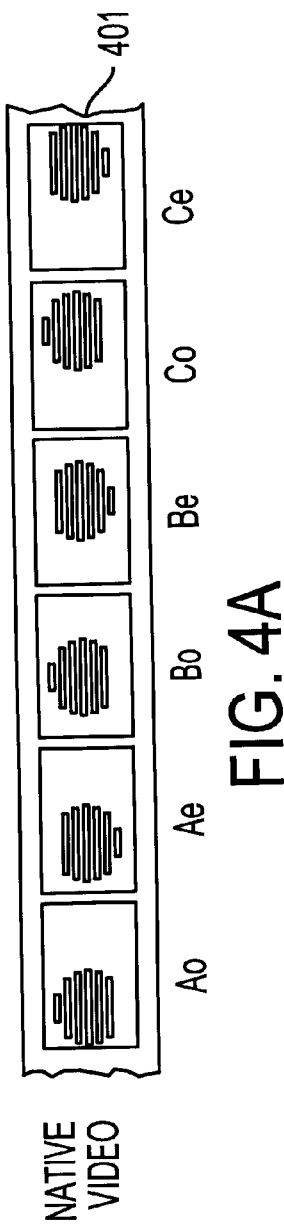
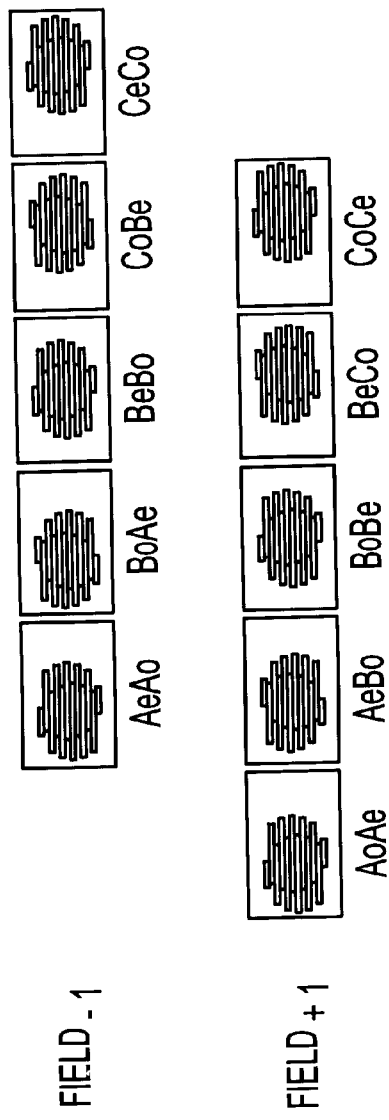

DETECTION OF PROGRESSIVE FRAMES IN A VIDEO FIELD SEQUENCE

BACKGROUND

The present invention relates to the field of video processing, and more particularly to methods and apparatuses for detecting the presence of progressive frames in a sequence of video fields.

A telecine is a well-known apparatus that converts a motion picture film into a video format for display on a device such as a television. Both motion picture film and video create the illusion of moving pictures by sequentially displaying a series of still image frames that represent the image at corresponding sequential instants of time. The conversion process must take into account differences in display format as well as differences in image frame rate.

Considering display format first, each portion of a motion picture film frame is displayed simultaneously to the user. By contrast, video images are created by sequentially "painting" dots, called "pixels", onto a suitable screen, such as a cathode ray tube (CRT). The pixels are supplied in an order that draws horizontal lines on the screen, one line at a time. This is performed at a fast enough rate such that the viewer does not experience the individual pixels, but rather sees the combination of displayed pixels as a single image. The lines of horizontal pixels may be drawn in several different ways. If a progressive scan order is used, the lines are supplied in sequence from, for example, top to bottom. Alternatively, an interlaced scan order can be used, wherein the image frame (which comprises the totality of scan lines to be displayed for the given frame) is divided into even and odd fields. The even field comprises all of the even numbered scan lines, and the odd field comprises all of the odd numbered scan lines. In an interlaced video display system, an entire even field is supplied to the screen, followed by the odd field. This pattern is then repeated for each frame to be displayed.

Considering now differences in display rates, standard motion picture film is shot at a rate of 24 frames per second (fps). By contrast, current existing television systems, such as those operating in accordance with National Television Standards Committee (NTSC), Phase Alternation Line (PAL) and High Definition (HD) television standards, have video frame rates that include 24, 30 and 25 fps.

In converting from a 24 fps film image to a 30 fps video image, the frame rate must increase by 25% so that when the film frames are played back as video they transpire in the same 1 second that they would have on film. This can be accomplished by outputting 2.5 video frames for every 2 film frames. Since a telecine typically needs to generate an interlaced video output comprising alternating odd and even fields, this rate difference equates to outputting 5 video fields for every 4 film fields. One way to accomplish this is by extracting 2 fields from one film frame, and 3 fields from the next. In the 3-field sequence (henceforth referred to as the field "triplet"), the first and third fields are derived from the same film frame, and are therefore identical. The specific conversion from 24 to 30 fps is called 2:3 pulldown (also referred to as 3:2 pulldown). This process is illustrated in FIG. 1(a). The top strip shows a film sequence 101 of a ball moving from left to right across the frame. Each of these frames may be considered to be in a "progressive" format since, if separated into odd and even fields, both fields will have been captured at the same instant in time. In contrast, the interlaced NTSC video format has odd and even fields that are captured ⅟₆₀ of a second apart.

The second strip in FIG. 1(a) shows the output 103 of the 3:2 pulldown telecine process. In the figure, the label "Ao" denotes the first odd video field, the label "Ae" denotes the first even video field, the label "Bo" denotes the second odd video field, and so on. Each successive pair of odd and even fields constitutes one video frame, capable of being displayed on an interlaced video display device. Note that as a result of the 3:2 pulldown process which selectively duplicates certain fields, the field "Co" is not in the same video frame as that constituted by the fields "Bo" and "Be" even though the field "Co" originated from the same film frame as the fields "Bo" and "Be". Likewise, although "Co" and "Ce" are in the same video frame, they originated in different film frames.

It is useful to have the capability of detecting whether telecine processing or other processing (e.g., computer-generated video, which would also be in the form of video fields that can be combined to form progressive video frames) has been employed in the generation of video material, and if so, to be able to identify those fields in the sequence that have been "pulled down". How this information is utilized depends on the type of application that is to take place. For example, when a telecine processed video image is to be compressed (i.e., so that the image can be represented in fewer digital bits) the repeated frames are simply discarded and the compression routine supplies the appropriate field replication markings. In another example, when a telecine processed video image is to undergo interlace-to-progressive format conversion, no processing to generate a synthetic field (either via interpolation or motion compensation techniques) takes place, and the action is merely to bundle back together the appropriate fields into their original progressive frame state. Thus a progressive frame may sometimes be reconstructed by pairing a source field with the field before, or with the field after, or sometimes with either. This is illustrated in FIG. 1(b). The first strip in FIG. 1(b) pairs each field with the immediately preceding field, and is thus labeled "Field−1". The next strip in FIG. 1(b) pairs each field with the immediately succeeding field, and is thus labeled "Field+1". Note that while some pairings yield the original progressive film frames (e.g., "AeAo" and "BeBo"), other pairings yield incorrect results (e.g., "BoAe" and "CeCo"). By correctly selecting the pairings which yield the original progressive film frames, a 60 fps progressive output can be achieved as shown in the last strip in FIG. 1(b).

Note in the last strip in FIG. 1(b) that there are two frames that have two correct pairings: a first frame that could either be "BeBo" or "BeCo", and a second frame that could either be "EoDe" or "EoEe". This is a characteristic of a field triplet. The center field can be paired with either the immediately preceding field or with the immediately succeeding field, since both are identical. In the video compression application, the second of the identical fields ("Co" and "Ee") would be labeled as being replicated and would not be subjected to the lengthy compression algorithm.

In a perfect (unedited) 3:2 sequence, replicated fields occur once every fifth field. Prior techniques for pulldown detection utilize this sequence repetition for identifying the field triplet location, and hence the 3:2 pattern. If the 3:2 sequence is not perfect, as is the case with edited material, the pattern is broken. The break in the sequence pattern cannot be detected until the location of the next field triplet arrives and the expected field replication is not found. Thus these conventional techniques must buffer the fields between the triplets or suffer the consequences of incorrect pairing. Decisions have to then be made on how to treat these buffered fields without the knowledge of where they fall in the 3:2 sequence, all of which leads to processing latency.

An example of edited 3:2 material is shown in FIGS. 2(a)–(e). FIG. 2(a) illustrates a telecined 3:2 pulldown sequence 201 with edited frames (Bo, Be) and (Do, De) shown in cross-hatch. FIG. 2(b) shows the same sequence 201' with the edited frames removed. As in FIG. 1(b), the FIGS. 2(c) and 2(d) show the results of pairings with the immediately preceding field (Field−1) and the immediately succeeding field (Field+1). Again, the strip depicted in FIG. 2(e) shows the pairing which would yield the original progressive film frame. Note that there is no appropriate pairing for the center two frames 203 and 205. This is because the fields that would have yielded the correct pairing with "Co" and "Ce" (i.e., Be and Do) were edited out. Fields "Co" and "Ce" are commonly referred to as "hanging fields". To produce a progressive field mate for these hanging fields, techniques such as field interpolation are typically employed.

The above-described 3:2 pulldown is just one type of conversion from motion picture film to a video format. For example, another film-to-video conversion process, called "2:2 pulldown", operates by extracting one odd and one even field from every film frame. This is illustrated in FIGS. 3(a) and 3(b) with the five strips representing the same stages as are depicted in FIGS. 1(a) and 1(b). Note that in contrast with 3:2 pulldown, there are no instances of two correct pairings for one video frame, due to there being no triplets in 2:2 pulldown video. Thus video frames can be edited out without disrupting the 2:2 sequence; however, hanging fields will occur if an edit occurs on a field boundary within a frame. Without the triplet, there is no easy and obvious key upon which to rely in determining when the 2:2 pulldown has begun, or when an edit has occurred in the middle of the 2:2 pulldown sequence.

As a point of comparison, FIG. 4(a) illustrates a strip of so-called "native video" 401, which is a sequence of video frames that did not originate from a film source or other progressive frame generator. FIG. 4(b) shows the field pairing associated with the "native video" 401. Note that for a scene with motion, there are no pairings that yield a correct progressive video frame. This is because each successive field is captured at a slightly later instant in time (e.g., at 1/60th of a second later than the immediately preceding field). In this case, as is the case with hanging fields, other techniques such as field interpolation, spatial-temporal filtering, motion adaptive, and motion compensation deinterlacing are necessary to provide the complementary field for pairing.

In accordance with conventional techniques, knowledge of the video type (e.g., 3:2 pulldown, 2:2 pulldown, computer-generated progressive, native) was required to accurately convert the interlaced fields to progressive frames. Since a large portion of source material has been edited, two or more of the video types are often combined. To cope with this possibility, ancillary information (e.g., an in-the-loop workstation operator, or a complete edit list supplied by an operator) was required, defining which video type was to be expected in order to correctly determine the field pairings for generation of the progressive frames. Thus, there is a need for an autonomous technique for detection of progressive frames in a mixed media film/video sequence that is independent of any a priori knowledge of the video type, and the frequency and location of edits. There is a further need for such a technique to be applicable to video processes such as interlace-to-progressive conversion and video compression.

SUMMARY

In accordance with one aspect of the present invention, the foregoing and other objects are achieved in methods and apparatuses that detect a progressive video frame in a sequence of video fields, wherein the sequence of video fields includes a target video field. This may be accomplished by generating a first metric by comparing the target video field with an immediately preceding video field. Alternatively, the first metric may be generated by comparing the target video field with an immediately succeeding video field. The first metric is then compared with a first threshold value. If the first metric is less than the first threshold value, then the immediately preceding video field (or alternatively, the immediately succeeding video field) is found to have been derived from a same progressive video frame as the target video field.

In another aspect of the invention, where the first metric is generated by comparing the target video field with an immediately preceding video field, progressive video frame detection may further include generating a second metric by comparing the target video field with an immediately succeeding video field; comparing the second metric with a second threshold value; and determining that the immediately succeeding video field is derived from the same progressive video frame as the target video field if the second metric is less than the second threshold value. In this way, fields are considered three-at-a-time. The first threshold value may be equal to the second threshold value, but this need not be the case in all embodiments.

In either or both of the above aspects, the first and second metrics may be indicative of a quantity of interlace artifacts.

In another aspect of the invention, generation of each metric may be accomplished by, for each of a group of target pixels comprising one or more pixels in the target video field, generating an inflection indicator, by comparing the target pixel with at least one neighboring pixel in the immediately preceding video field; for each of one or more of the target pixels, generating an artifact detection indicator by determining whether a pattern formed by the inflection indicator of the target pixel and the inflection indicators of one or more neighboring pixels matches at least one of one or more artifact-defining patterns; and generating the metric by combining the artifact detection indicators.

In yet another aspect of the invention, generating the artifact detection indicators includes, for each of one or more of the target pixels, performing an artifact detection indicator operation that comprises: first determining whether the target pixel has an inflection. If the target pixel has an inflection, then determining whether there is a first vertically displaced pixel in the line above the target pixel and also a second vertically displaced pixel in the line below the target pixel, wherein the first vertically displaced pixel lies either directly in line with the target pixel or else is horizontally displaced by no more than one pixel location from the target pixel, wherein the second vertically displaced pixel lies either directly in line with the target pixel or else is horizontally displaced by no more than one pixel location from the target pixel, and wherein the first and second vertically displaced pixels each have an inflection indicator of the opposite polarity to that of the target pixel. If the target pixel has an inflection, then it is determined whether there is a horizontally adjacent pixel having an inflection indicator of the same polarity. Additionally, if the target pixel has an inflection, it is determined whether there is not a horizontally adjacent pixel with an inflection indicator of opposite polarity to that of the target pixel.

In still another aspect of the invention, the inflection indicator comprises a positive contrast inflection flag and a negative contrast inflection flag that are generated in accordance with:

$$I_+(x,y) = ((i(x,y)-i(x,y-1)) > +T) \cap ((i(x,y)-i(x,y+1)) > +T)$$

$$I_-(x,y) = ((i(x,y)-i(x,y-1)) < -T) \cap ((i(x,y)-i(x,y+1)) < -T)$$

where:
- $I_+(x,y)$ is the positive contrast inflection flag at pixel location (x,y);
- $I_-(x,y)$ is the negative contrast inflection flag at pixel location (x,y);
- i(x,y) is an intensity value at pixel location (x,y); and
- T is an inflection intensity threshold.

In yet another aspect of the invention, the first metric may be generated by summing the artifact detection indicators. Alternatively, the first metric may be generated by, for each of one or more of the target pixels, computing a local average of the artifact detection indicators, whereby a set of local averages is generated; and selecting a highest local average from the set of local averages for use as the first metric. This latter technique is useful for detecting artifacts when the video fields have only one or more very small portions that are representative of motion.

In yet other embodiments of the invention, a progressive video frame is detected in a sequence of video fields, wherein the sequence of video fields includes a target video field, and wherein each of the video fields comprises a plurality of pixels. This is accomplished by, for each of a group of target pixels comprising one or more pixels in the target video field, generating a first metric by comparing the target pixel with a corresponding pixel in an immediately preceding video field, whereby a set of first metrics is generated; for each of the target pixels, generating a second metric by comparing the target pixel with a corresponding pixel in an immediately succeeding video field, whereby a set of second metrics is generated; and using the set of first metrics and the set of second metrics to determine which, if any, of the immediately preceding and immediately succeeding video fields is derived from a same progressive video frame as the target video field.

In another aspect of the invention, the act of using the set of first metrics and the set of second metrics to determine which, if any, of the immediately preceding and immediately succeeding video fields is derived from the same progressive frame as the target video field includes, for each of the target pixels, forming a ratio of the first metric with respect to the second metric, whereby a set of ratios is formed, and wherein each ratio is an indicator of whether none, one or both of the immediately preceding and immediately succeeding video fields are progressive matches to the target video field. Then, a first value is generated that represents how many pixels have a ratio that indicates that none of the immediately preceding and immediately succeeding video fields are progressive matches to the target video field; a second value is generated that represents how many pixels have a ratio that indicates that one of the immediately preceding and immediately succeeding video fields is a progressive match to the target video field; a third value is generated that represents how many pixels have a ratio that indicates that both of the immediately preceding and immediately succeeding video fields are progressive matches to the target video field. Then, it is determined which, if any, of the immediately preceding and immediately succeeding video fields is derived from the same progressive frame as the target video field based on which of the first, second, and third values is largest.

In still another aspect of the invention, for each ratio, the immediately succeeding video field is derived from a same progressive frame as the target video field if the ratio is greater than an upper threshold value; for each ratio, the immediately preceding video field is derived from the same progressive frame as the target video field if the ratio is less than a lower threshold value; and for each ratio, both the immediately preceding and immediately succeeding video fields are derived from the same progressive frame as the target video field if the first metric and the second metric are both equal to zero.

In yet another aspect of the invention, for each ratio, neither of the immediately preceding and immediately succeeding video fields are derived from the same progressive frame as the target video field if the ratio is both greater than the lower threshold value and less than the upper threshold value.

In still another aspect of the invention, the target video field is synthesized by interpolating vertically aligned pixels in a source video field that is between the immediately preceding and immediately succeeding video fields.

In yet another aspect of the invention, the first metric is determined in accordance with:

$$D_{-1}[x,y] = |\text{FIELD}n-1[x,y] - \text{FIELD}n'[x,y]|;$$

and the second metric is determined in accordance with:

$$D_{+1}[x,y] = |\text{FIELD}n+1[x,y] - \text{FIELD}n'[x,y]|,$$

wherein:
- FIELDn'[x,y] is a pixel located at location x,y in the synthesized target video field;
- FIELDn−1[x,y] is a pixel located at location x,y in the immediately preceding video field; and
- FIELDn+1[x,y] is a pixel located at location x,y in the immediately succeeding video field.

In still another aspect of the invention, the progressive video frame detection technique further includes detecting a set of pixels in the target video field that are representative of motion in the video input. In such embodiments, the step of using the set of first metrics and the set of second metrics to determine which, if any, of the immediately preceding and immediately succeeding video fields is derived from a same progressive video frame as the target video field may be performed by utilizing only the set of pixels in the target video field that are representative of motion in the video input.

In yet another aspect of the invention, the step of detecting the set of pixels in the target video field that are representative of motion in the video input includes comparing each of one or more pixels in the immediately preceding video field with a corresponding one of one or more pixels in the immediately succeeding video field. Here, for each of the one or more pixels, a representation of motion is detected if an absolute value of a difference between the pixel in the immediately preceding video field and the pixel in the immediately succeeding video field is greater than a threshold amount.

In still another aspect of the invention, the first metric is determined in accordance with:

$$D_{-1}[x,y] = |\text{FIELD}n-1[x,y] - \text{FIELD}n[x,y]|;$$

and the second metric is determined in accordance with:

$$D_{+1}[x,y] = |\text{FIELD}n+1[x,y] - \text{FIELD}n[x,y]|,$$

wherein:

FIELDn[x,y] is a pixel located at location x,y in the target video field;

FIELDn−1[x,y] is a pixel located at location x,y in the immediately preceding video field; and FIELDn+1[x,y] is a pixel located at location x,y in the immediately succeeding video field.

BRIEF DESCRIPTION OF THE DRAWINGS

The objects and advantages of the invention will be understood by reading the following detailed description in conjunction with the drawings in which:

FIGS. 2(a)–(e) illustrate an example of edited 3:2 material;

FIG. 3(a) illustrates a 2:2 pulldown process;

FIG. 3(b) illustrates reconstruction of a progressive frame from 2:2 pulldown material by pairing a source field with the field before, or with the field after, or sometimes with either;

FIG. 4(a) illustrates a strip of "native video";

FIG. 4(b) shows the field pairing associated with the "native video";

DETAILED DESCRIPTION

Figure 1A:
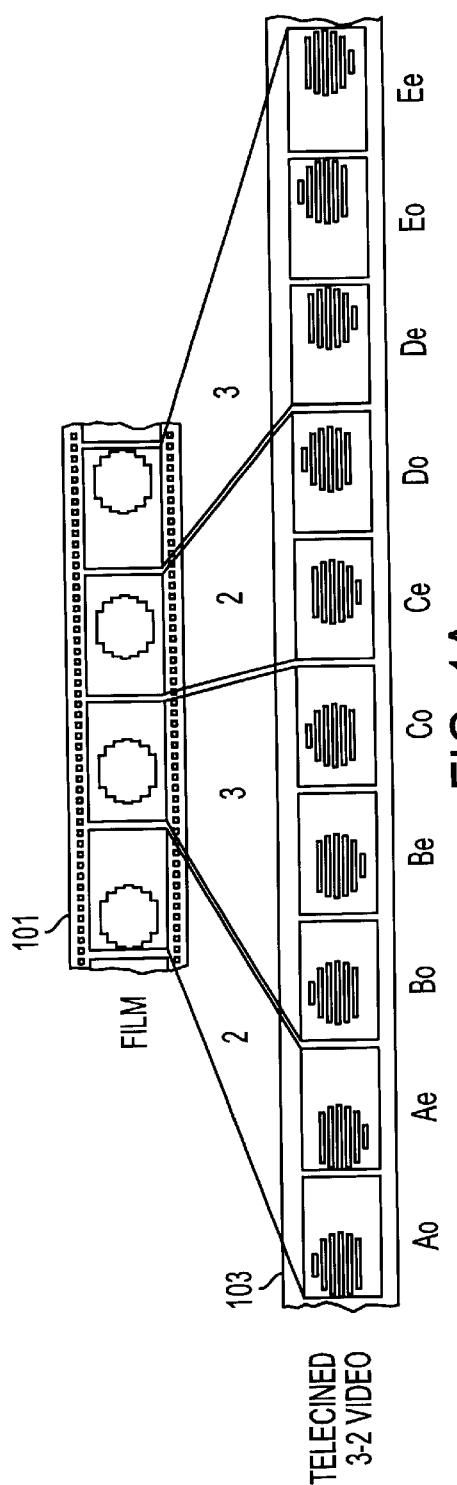
FIG. 1(a) illustrates a 3:2 pulldown process.
Figure 1B:
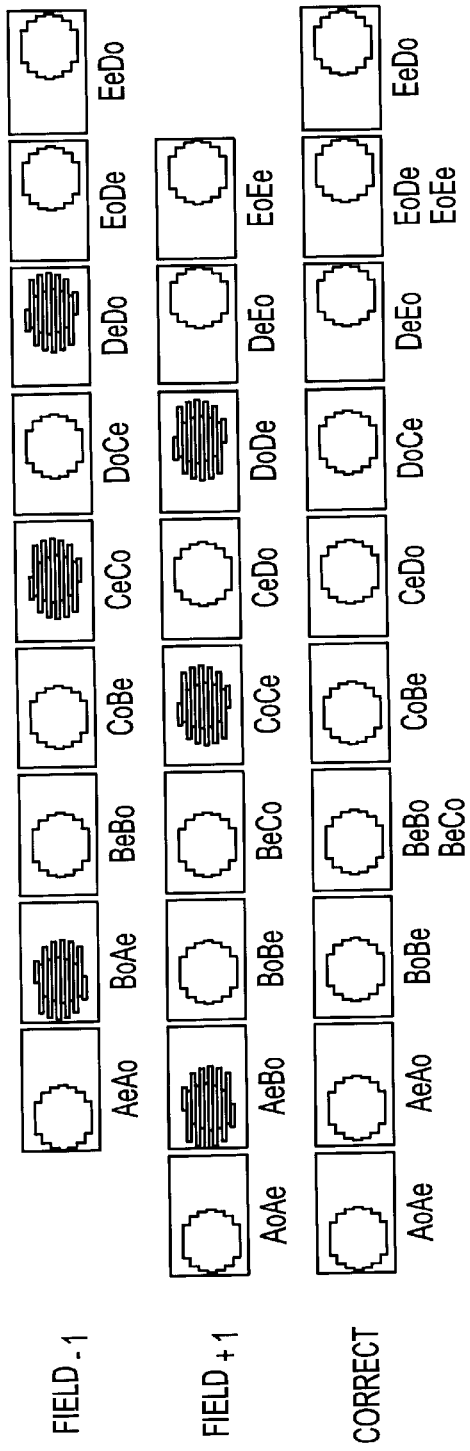
FIG. 1(b) illustrates reconstruction of a progressive frame from 3:2 pulldown material by pairing a source field with the field before, or with the field after, or sometimes with either.

The various features of the invention will now be described with respect to the figures, in which like parts are identified with the same reference characters.

The invention provides methods for autonomously detecting the presence of progressive video frames (e.g., such as those generated by telecine processing) in a mixed media film/video frame sequence. The invention, which is capable of operating in real time, has a wide range of video applications from interlace-to-progressive conversion to video compression, as well as any other application that may take advantage of the knowledge of the existence of progressive frames in a video sequence. This is accomplished by means of a technique in which one or more metrics are generated for each field by comparing the field with an immediately preceding and an immediately succeeding frame. The one or more metrics may then be compared with one or more threshold values to determine whether or not the field under consideration is the product of a progressive frame.

In one embodiment of the invention, progressive frames are detected based on the absence of interlace artifacts (associated with incorrect field pairings). In an alternative embodiment, progressive frames are detected based upon an estimate of adjacent frame differences. Each of the embodiments uses the fields immediately preceding and succeeding the source field in the progressive frame detection process, which is in sharp contrast to conventional techniques that involve buffering fields and looking for a recurrent field sequence.

The invention provides a robust means for processing a wide variety of video material, including 3:2 pulldown, 2:2 pulldown, and edited video with broken 3:2 sequences and/or hanging fields. Since native video with motion will always have interlace artifacts, the invention will recognize it as non-telecine-generated.

The inventive progressive frame detector can be utilized in many ways. For example, in the case of interlace-to-progressive conversion, the detection of progressive frames allows the application to skip the computation-intensive processing of motion estimation/compensation and generation of a progressive field, and instead simply re-unites the progressive fields that have been detected. In the case of video compression, the detected field that has been "pulled down" may be tagged as a replicated field that is simply replaced by a repeat field code, thereby removing it from the computation-intensive compression processing of motion estimation, temporal residual image generation and encoding.

To have a better understanding of the basis for the invention, consider, for example, the 3:2 pulldown process, which essentially takes a pair of progressive frames of film, in which the two fields comprising each frame have been generated at the same time t, and creates five fields by duplicating one of the original fields. Then, when each pair of fields of the telecine-generated video are taken to be a frame, some of these field pairs will correspond to the same time t, while other pairs will be off by a time constant, either (t−1, t) or (t, t+1). In areas in which there is no motion, this will be of no consequence because these image areas are the same for over the span of all of these time periods. However, wherever there is motion, artifacts similar to, and often more severe than, those observed in interlaced video will be evident. It is these artifacts that are exploited on a field by field basis in the progressive frame detection mechanism described herein. Since the progressive frame detection occurs on a field by field basis, the type of pulldown, whether it be 2:2, 3:2 or any other format, existing in the mixed media video frame sequence is irrelevant to this detection technique.

Figure 5A:
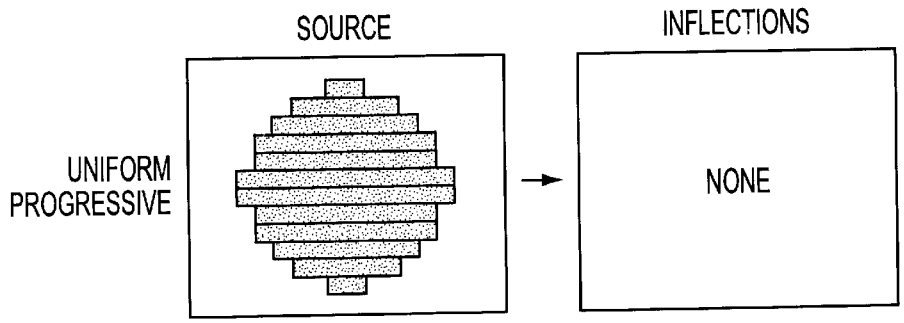
FIGS. 5(a)–(d) illustrate four different classes of paired fields.
Figure 5B:
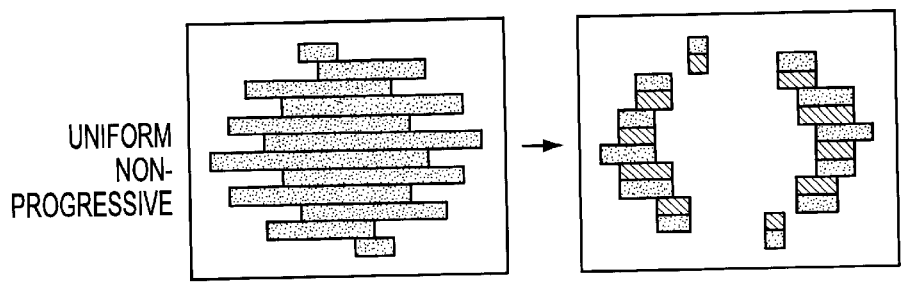
Figure 5C:
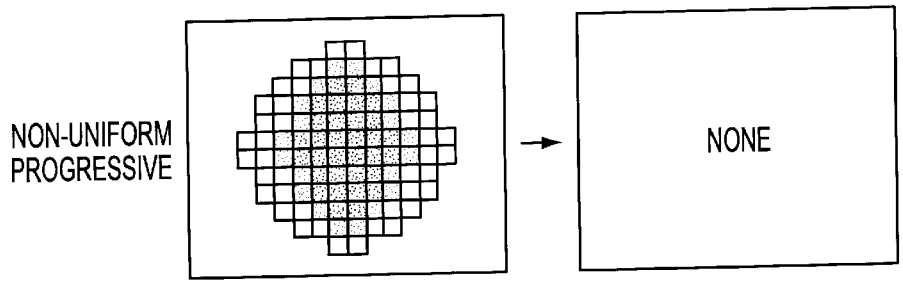
Figure 5D:
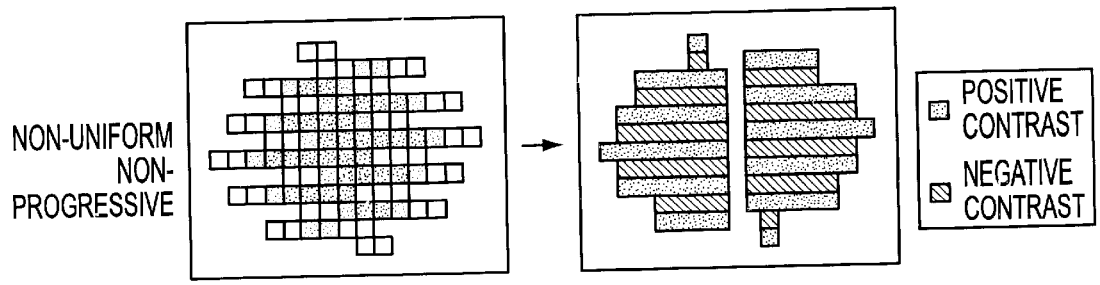

One use of the progressive frame detector is to determine the appropriate field (if any) which, when paired with the source field, yields a correct progressive video frame. It is clearly visible from FIGS. 1–4 that incorrect field pairs lead to frames that have horizontal striations. This is shown in greater detail in FIGS. 5(a)–(d), which illustrate four different classes of paired fields. FIGS. 5(a) and 5(b) represent objects (and background) with a uniform intensity distribution, whereas FIGS. 5(c) and 5(d) illustrate objects (and background) having variations in intensity (darker shading represents higher intensities). Furthermore, FIGS. 5(a) and 5(c) illustrate fields that were captured at the same instant in time (or for which there was no motion), whereas FIGS. 5(b) and 5(d) illustrate fields that were captured at different times and that have object motion. In each of these figures, the column labeled "SOURCE" shows the input to the processing.

These and other aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic" or "logic configured to" perform a described action.

In accordance with one embodiment of the invention, the progressive frame detection processing is based on metrics that quantify the number of interlace artifacts, (also referred to as striations) between a target video field and its immediately preceding and immediately succeeding video fields. The fewer the number of interlace artifacts, the more likely it is that the target video field and its immediately adjacent video field derived from a same progressive frame. This in turn is indicative that the target video field was generated, for example, by telecine processing.

Figure 6:
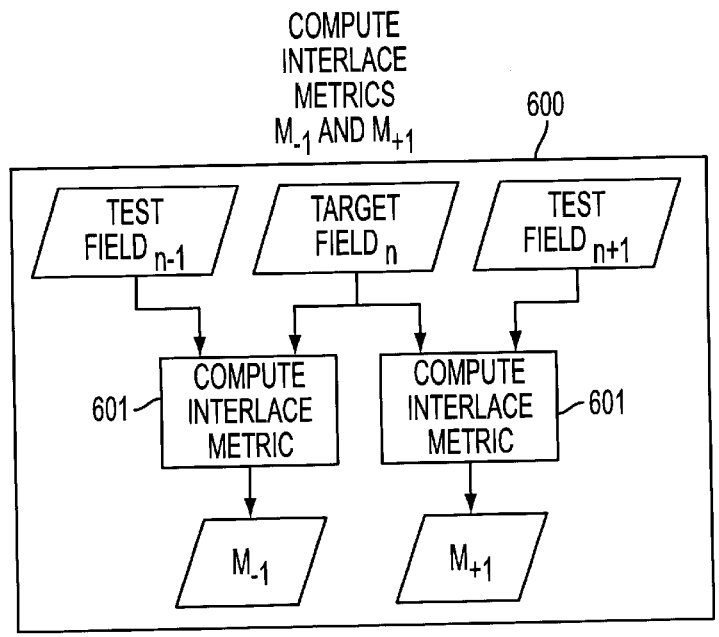
FIG. 6 is a block diagram of computation logic that computes the necessary interlace metrics in accordance with one embodiment of the invention.

Referring now to FIG. 6, a block diagram of computation logic 600 that computes the necessary interlace metrics in accordance with this embodiment of the invention. A video input is analyzed one field at a time. For each field under consideration, referred to as the "TARGET FIELDn", a first interlace metric, $M_{-1}$, is computed by comparing the TARGET FIELDn with its immediately preceding field ("TEST FIELDn−1"), and a second interlace metric, $M_{+1}$, is computed by comparing the TARGET FIELDn with its immediately succeeding field ("TEST FIELDn+1").

Figure 7:
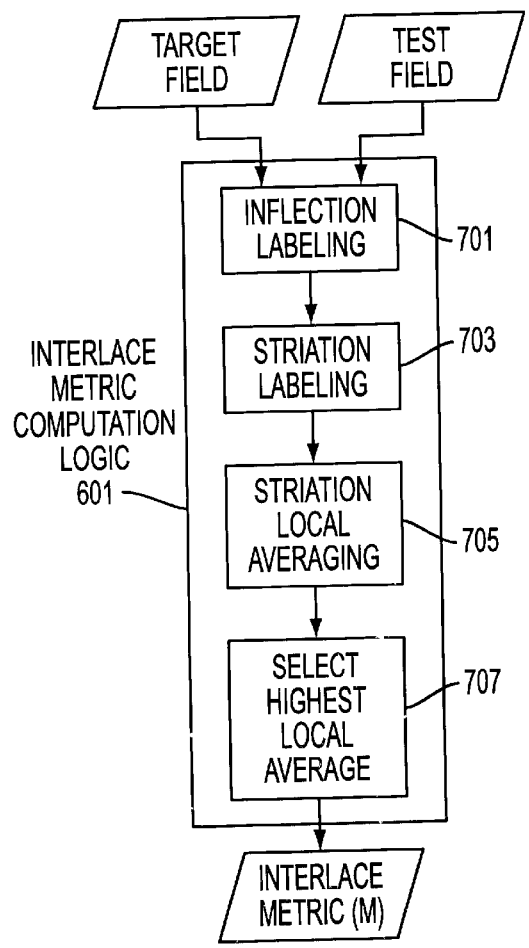
FIG. 7 is a more detailed block diagram of interlace metric computation logic that computes each of the first and second interlace metrics in accordance with an embodiment of the invention.

The interlace metric computation logic 601, that computes each of the first and second interlace metrics, is shown in greater detail in FIG. 7. Inflection labeling logic receives the TARGET FIELDn and one of its immediately adjacent test fields (either TEST FIELDn−1 or TEST FIELDn+1), and identifies the pixels that have a positive or negative "inflection". A positive inflection occurs where a pixels intensity is greater than (by a predefined threshold amount) both pixel values in the line immediately above and below. A negative inflection occurs where a pixel's intensity is less than (by a predefined threshold amount) both pixel values in the line immediately above and below. The inflections are defined by the equations, $$I_+(x,y) \equiv ((i(x,y)-i(x,y-1)) > +T) \cap ((i(x,y)-i(x,y+1)) > +T)$$

$$I_-(x,y) \equiv ((i(x,y)-i(x,y-1)) < -T) \cap ((i(x,y)-i(x,y+1)) < -T)$$

where:

$I_+(x,y) \equiv$ Positive contrast inflection flag (0 or 1) at pixel location (x,y);

$I_-(x,y) \equiv$ Negative contrast inflection flag (0 or 1) at pixel location (x,y);

$i(x,y) \equiv$ Intensity at pixel location (x,y); and $T \equiv$ Inflection intensity threshold.

The threshold, T, reject inflections that are too subtle to be attributed to actual interlace artifacts, as is the case with noise. The second column in FIGS. 5(a)–(d) illustrates the inflections detected from each source. In the two progressive sources (FIGS. 5(a) and 5(c)) there are no inflections detected, while in the two non-progressive sources (FIGS. 5(b) and 5(d)), there are detections. In the "UNIFORM NON-PROGRESSIVE" example (FIG. 5(b)), the only inflections occur on the left and right side (in general, on the boundary) of the objects. The dark "lines" in the source image yield the positive contrast inflections; and the light "lines" in between yield the negative contrast inflections. Even though the object's central pixels have been displaced, their uniform intensity yields no inflections.

This is not the case for the "NON-UNIFORM NON-PROGRESSIVE" example (FIG. 5(d)). Here, the internal intensity distribution yields inflections across most of the object. It is noted that inflections can occur across the entire object, and not just around the boundary. This yields a stronger indicator that the image contains striations. This example is representative of most video scenes, and thus demonstrates the case of detecting the inflections.

Figure 8:
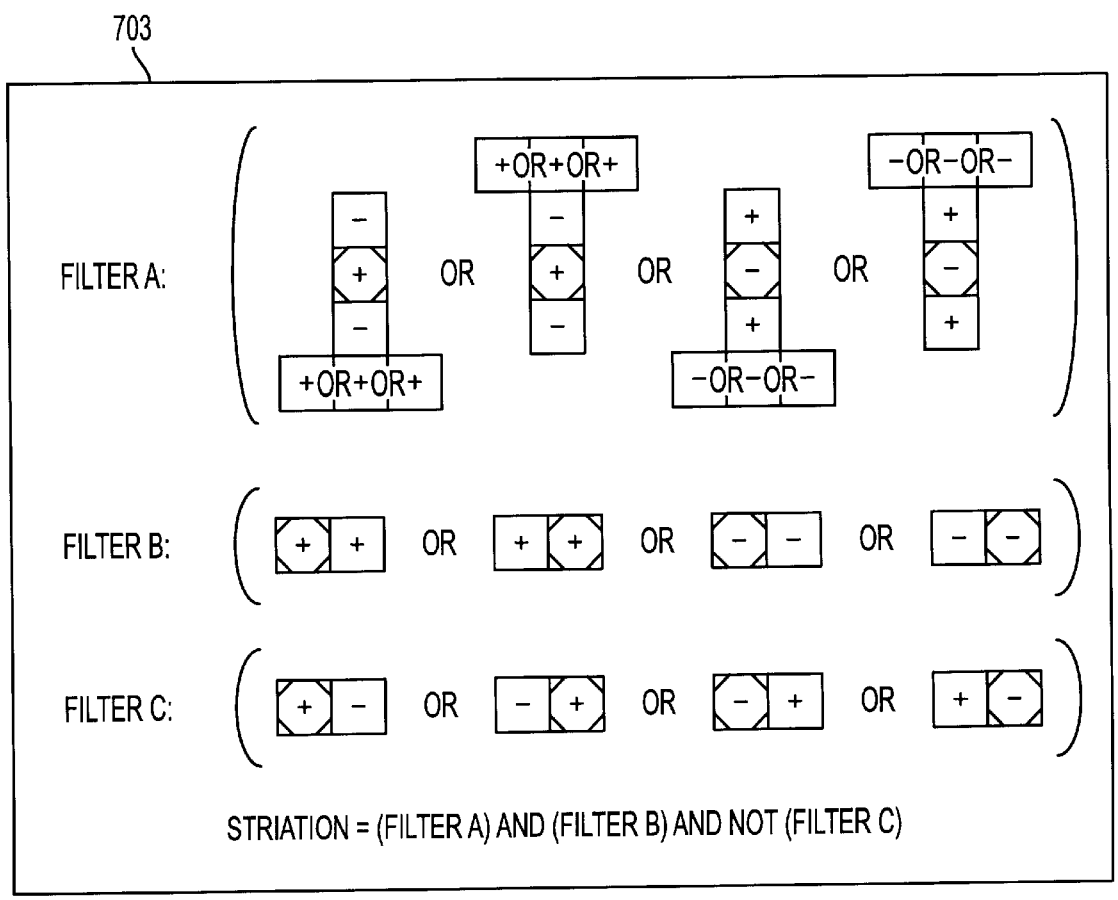
FIG. 8 illustrates processing performed by striation labeling logic in accordance with an aspect of the invention.

Having identified inflections in the frame comprising the target and test field, striations are now labeled. This is performed by striation labeling logic 703. The inflection labeling logic 701 generates an output that specifies, preferably for each pixel in the frame comprising the target and test fields, whether that pixel is a positive or negative inflection, or neither. The striation labeling logic 703 then further labels the pixel as being a striation if that pixel and its surrounding neighbors satisfy specific conditions. FIG. 8 illustrates processing performed by the striation labeling logic 703 in greater detail. Three sets of filters are used to determine if the striation conditions are met. In FIG. 8, each square represents a pixel, with the pixel under consideration being designated by an additional octagon. The plus sign (+) denotes a positive inflection pixel (as determined by the inflection labeling logic 701), with the minus sign (−) denoting a negative inflection. In each filter there are four templates, two orientations of the two inflection polarities. Filter A looks for alternating vertical inflection patterns. In Filter A, the two "OR"s between the three horizontal pixels specifies that at least one of those conditions must be met. Filters B and C, in combination, look for at least one of the pixels on either side of the pixel under consideration to have the same inflection as the pixel under consideration, and for the remaining pixel (if any) on the other side of the pixel to not have an opposite inflection as the pixel under consideration. (Positive and negative inflections are opposites; "no inflection" is neutral to both positive and negative inflections.) The logical combination of the three filters, A, B, and C, results in a tagging of each pixel in the image. The tagging may, for example, be in the form of a binary value (0 or 1), although this is not essential to the invention. Those pixels tagged with a "1" may be deemed a striation.

The filters depicted in FIG. 8 are but just one way of tagging the pixels. More generally, any tagging technique can be used that identifies striations. In accordance with an aspect of the invention, striations are patterns of pixels that satisfy all of the following conditions:

Given a pixel under consideration that has been given an inflection indicator, there must be a pixel in the line above it and also in the line below it, lying either directly in line with the pixel under consideration or horizontally displaced by no more than one pixel location, having an inflection indicator of the opposite polarity;

For the given pixel under consideration that has been given an inflection indicator, there must be a horizontally adjacent pixel having an inflection indicator of the same polarity; and For the given pixel under consideration that has been given an inflection indicator, there must not be a horizontally adjacent pixel with an inflection indicator of opposite polarity to that of the given pixel under consideration.

It is noted that the mere fact that an image contains a striation does not necessarily mean that the image is not derived from a progressive frame. High frequency structures in the image can sometimes lead to striation noise. Thus there is a need for some type of thresholding. Having labeled all of the striations in a TARGET FIELDn and in the test fields TEST FIELDn−1 and TEST FIELDn+1, it is therefore possible to generate a sum of the striations and to use this as a metric that is indicative of whether the TARGET FIELDn derived from a progressive video frame. The metric would simply be compared to the threshold to make this determination.

However, in another aspect of the invention, it is a further goal to enable correct classification of a scene that is primarily stationary with the exception of the motion of a small object. If the threshold with which the metric is compared is based on the total (or average) striations over the entire image, this small object motion can be lost in a low background striation noise level. However, by instead computing a local average (of "small object size") over the image, the object striation count will be significant compared to the summed sporadic striation noise. A summation size should be chosen which is large enough to be statistically meaningful, yet small enough to be sensitive to small regions of motion. A size of 11×11 has been used with great success over a wide variety of video sequences. Thus, the interlace metric computation logic 601 further includes striation averaging logic 705 that computes separate local averages for pixels in a video frame formed by the target field and the test field. This is done in accordance with the following equation:

$$M(x, y) = \frac{\sum_{i=-k_x/2}^{+k_x/2} \sum_{j=-k_y/2}^{+k_y/2} S(x+i, y+j)}{k_x * k_y}$$

where:

M(x,y)≡Interlace metrics value at pixel location (x,y);
S(x,y)≡Striation value (0 or 1) at pixel location (x,y);
$k_x$≡Horizontal summation kernel size; and
$k_y$≡Vertical summation kernel size It will be apparent to those of ordinary skill in the art that the above equation cannot be applied to pixels lying too close to one or more edges in the video frame (i.e., those pixels for which a complete kernel cannot be identified). Accordingly, in preferred embodiments, metrics are not computed for such pixels.

The set of metrics generated by the striation averaging logic 705 are then supplied to selection logic 707 that selects the highest of all of the generated local averages for use as the interlace metric, M.

Referring back now to FIG. 6, the first and second interlace metrics, $M_{-1}$ and $M_{+1}$ are generated in the manner described above. These metrics may then be used to determine whether the TARGET FIELDn is part of a progressive video frame. This, in turn, is useful in a number of applications, including interlace-to-progressive video conversion, and video compression. These aspects are illustrated in the flow chart of FIG. 9. First, the video input is supplied to computation logic 600 that computes the necessary interlace metrics $M_{-1}$ and $M_{+1}$ (step 901). Next, the interlace metrics are tested to determine whether $M_{-1}$ is less than a first threshold value, $T_{M1}$, or whether $M_{+1}$ is less than a second threshold value, $T_{M2}$ (decision block 903). In some embodiments, the first and second threshold values may be equal to one another, although this is not essential to practicing the invention. In practice, the first and second threshold values, $T_{M1}$ and $T_{M2}$, may be set to have a value on the order of 0.15.

If neither of the interlace metrics is less than its corresponding threshold value ("NO" path out of decision block 903), the video field under consideration (FIELDn) is either a native (i.e., originally interlaced) video field, or else is a progressive video field that had originally been adjacent to one or more other progressive video fields that were edited out. This information may be useful, for example, in the case in which it is desired to convert the interlace-formatted video input into a progressive video output. In such an application, one would now know that to generate the next progressive video field, the field under consideration, FIELDn, will have to be interpolated (STEP 905), since the video input does not include a matching FIELDn−1 or FIELDn+1. The interpolation may be a simple two-pixel average, or a more complicated multi-tap filter.

Also, for the case in which it is desired to compress the video input, knowledge that the video field under consideration is not a progressive match is useful because one would now know that a full compression algorithm must be run on the video field under consideration (i.e., there are no duplicate fields that can simplify be replaced by a duplicate field indicator) (step 910).

Returning to decision block 903, if at least one of the interlace metrics is less than its corresponding threshold value ("YES" path out of decision block 903), then the field under consideration, FIELDn, is derived from a progressive video frame. This information may be useful for compressing the video input, as well as for performing interlaced-to-progressive video conversion. If video compression is desired, the interlace metrics are tested to determine whether both are less than their corresponding threshold values (decision block 907). If so ("YES" path out of decision block 907), then a triplet has been encountered. Compression processing can use this information to skip the lengthy processing associated with compressing the replicated video field, and to instead include a marker indicating the presence of a replicated field. Interlaced-to-progressive video conversion can use this information by selecting either one of the immediately preceding and immediately succeeding video fields for output; the choice of the one selected does not matter, since these adjacent video fields are identical to one another.

If only one of the metrics was less than its corresponding threshold value ("NO" path out of decision block 907), then there is no replicated video field and compression processing cannot be skipped (step 910). Furthermore, if it is desired to perform an interlaced-to-progressive video conversion, then the knowledge that the field under consideration, FIELDn, is derived from a progressive frame permits a best neighboring field to be selected to generate the progressive video field. To do this, the two interlace metrics are compared to one another (decision block 911). If $M_{-1}$ is less than $M_{+1}$ ("YES" path out of decision block 911), then the immediately preceding video field, FIELDn−1, should be selected (step 913) because the combination of the field under consideration, FIELDn, with its immediately preceding video field, FIELDn−1, generates a progressive frame having the least number of interlace artifacts.

However, if $M_{-1}$ is not less than $M_{+1}$ ("NO" path out of decision block 911), then the immediately succeeding video field, FIELDn+1, should be selected (step 915) because the combination of the field under consideration, FIELDn, with its immediately succeeding video field, FIELDn+1, generates a progressive frame having the least number of interlace artifacts.

Figure 9:
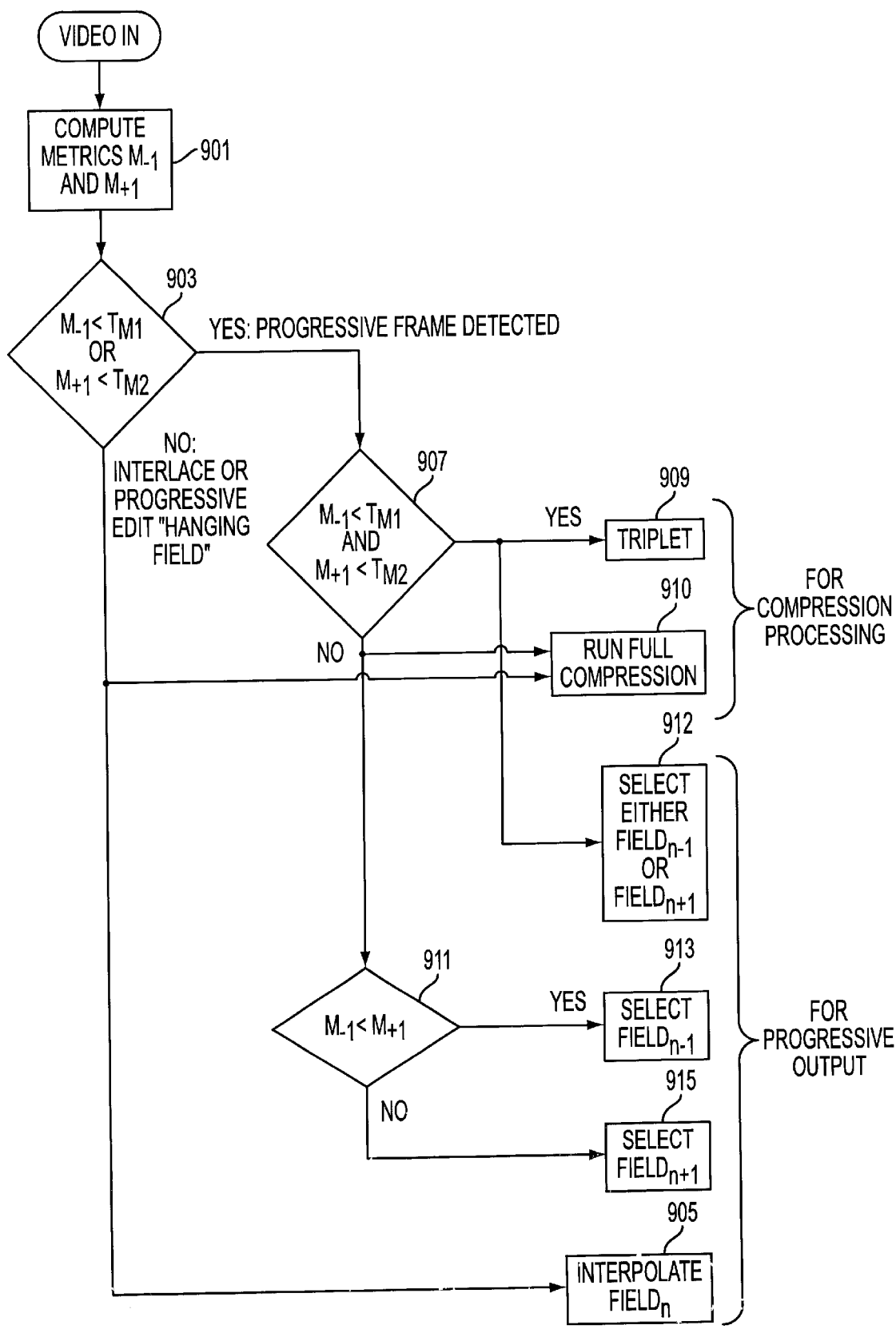
FIG. 9 is a flow chart illustrating the use of the inventive metrics in a number of applications.

It is noted that FIG. 9 illustrates the use of the interlace metrics for both video compression and interlaced-to-progressive video conversion. However, those of ordinary skill in the art will recognize that for applications desiring to do only one of these tasks (i.e., compression or conversion), it is unnecessary to perform all of the tests and steps illustrated in the flow chart: only those necessary to accomplish the desired goal are necessary. For example, if it is desired only to perform interlaced-to-progressive video conversion, it is unnecessary to perform any of steps 907, 909, 910 and 912. Alternatively, if it is desired only to perform video compression, it is unnecessary to perform any of steps 905, 911, 912, 913, and 915.

Figure 10:
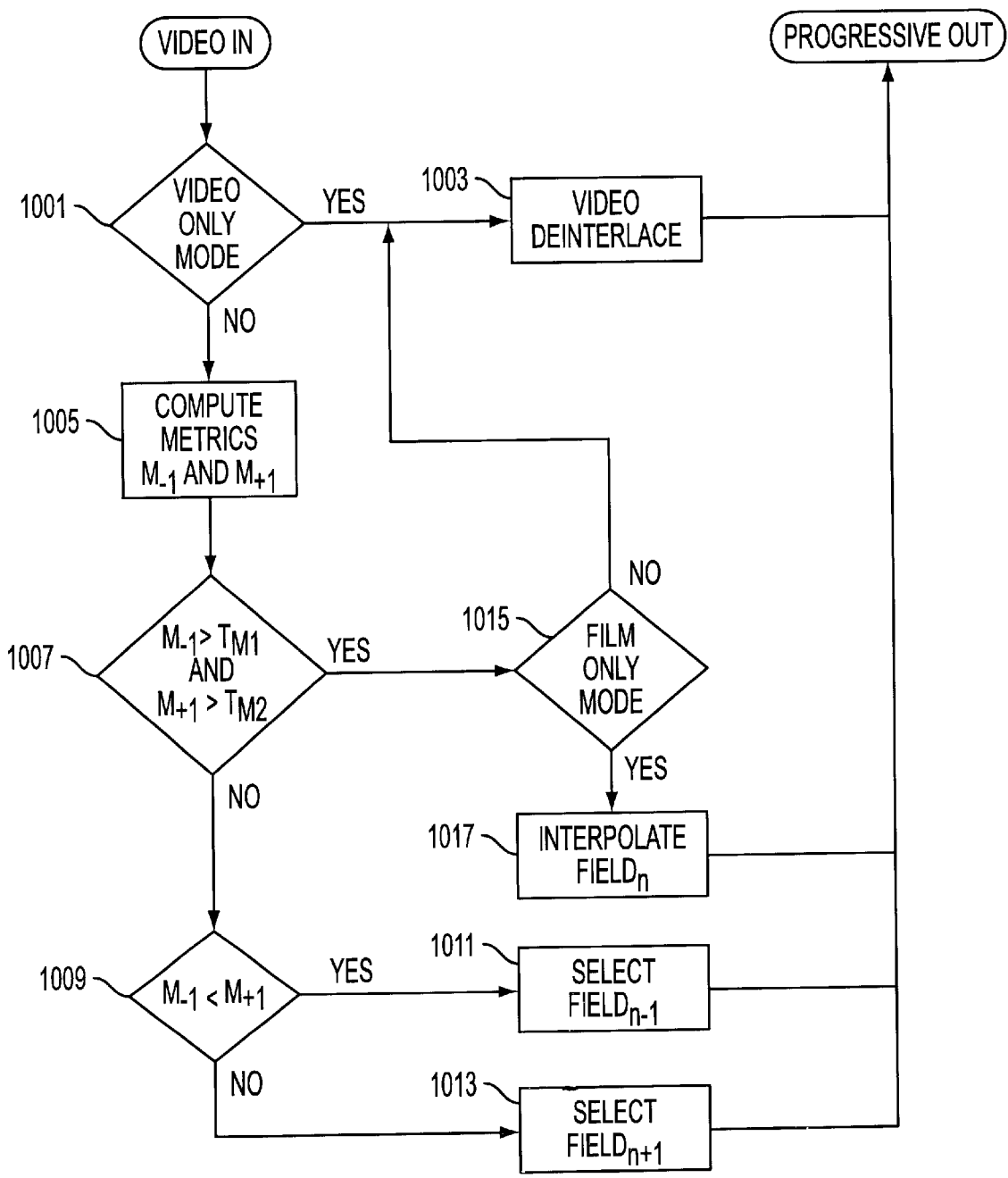
FIG. 10 is a flow chart showing another application of the inventive progressive frame detector, this time for the purpose of performing interlaced-to-progressive video conversion when the video input can be any of a number of types, including mixtures of native video edited with telecine-generated (or other progressive frame-based) video.

Turning now to FIG. 10, this is a flow chart showing another application of the inventive progressive frame detector, this time for the purpose of performing interlaced-to-progressive video conversion when the video input can be any of a number of types, including mixtures of native video edited with telecine-generated (or other progressive frame-based) video. The flowchart in FIG. 10 represents a user-selectable, three mode progressive frame generation system. This is to accommodate those situations in which a user actually knows the heritage of the supplied video input, although as will be seen, such knowledge is not a necessity. The first mode of operation is "video-only" (decision block 1001). In this mode ("YES" path out of decision block 1001), the interlace metric computation is skipped, and a traditional deinterlace algorithm is used to synthesize the complement to FIELDn (step 1003).

If the supplied video input is not known to be "video only" ("NO" path out of decision block 1001), then the interlace metrics, $M_{-1}$ and $M_{+1}$, are computed by computation logic 600 (step 1005), as previously described. The metrics are then tested as follows:

If one or both of the metrics are below their respective thresholds ("NO" path out of decision block 1007), then one or more progressive frames are detected (i.e., at least one of the immediately preceding and immediately succeeding fields, FIELDn−1 and FIELDn+1, is a "correct" match for the video field under consideration, FIELDn). Accordingly, it is desired to determine which one of the immediately preceding and immediately succeeding video fields is a "correct" match. To do this, the interlace metrics are compared with one another (decision block 1009). If the first interlace metric, $M_{-1}$, is the smaller of the two ("YES" path out of decision block 1009), then the immediately preceding video field is selected as the output (step 1011). If the first interlace metric is not the smaller of the two ("NO" path out of decision block 1009), then the immediately succeeding video field is selected as the output (step 1013).

Returning to decision block 1007, if both metrics are greater than their respective threshold values ("YES" path out of decision block 1007), then the supplied video input is either native video, or else includes progressive-based (e.g., telecine-generated) video that has been edited. A test is therefore performed to determine whether the converter is in "film-only" mode (decision block 1015). If so, this means that the supplied video input is, for example, telecine-generated video that has been edited ("YES" path out of decision block 1015). (Note: "film-only" need not refer strictly to traditional film, but may, for example, refer to other progressive-formatted image sources, such as computer-generated images.) This type of input can easily be converted by performing an interpolation to synthesize the FIELDn (step 1017).

If the converter is not in "film-only" mode ("NO" path out of decision block 1015), then the converter is in a "mixed film/video" mode. In this case, it cannot be determined whether the field under consideration is the result of native video or whether it is progressive-based (e.g., telecine-generated) video that has been edited. Thus, the output field must be synthesized by means of a more complex video deinterlace technique (step 1003), such as motion adaptive or motion compensated video field synthesis.

Note that selection of the "video-only" and "film-only" modes exists only to circumvent unnecessary processing when the mode of the input video is already known. The "mixed film/video" mode itself is capable of autonomously handling all three input modes without any prior knowledge of the input video type.

Figure 11A:
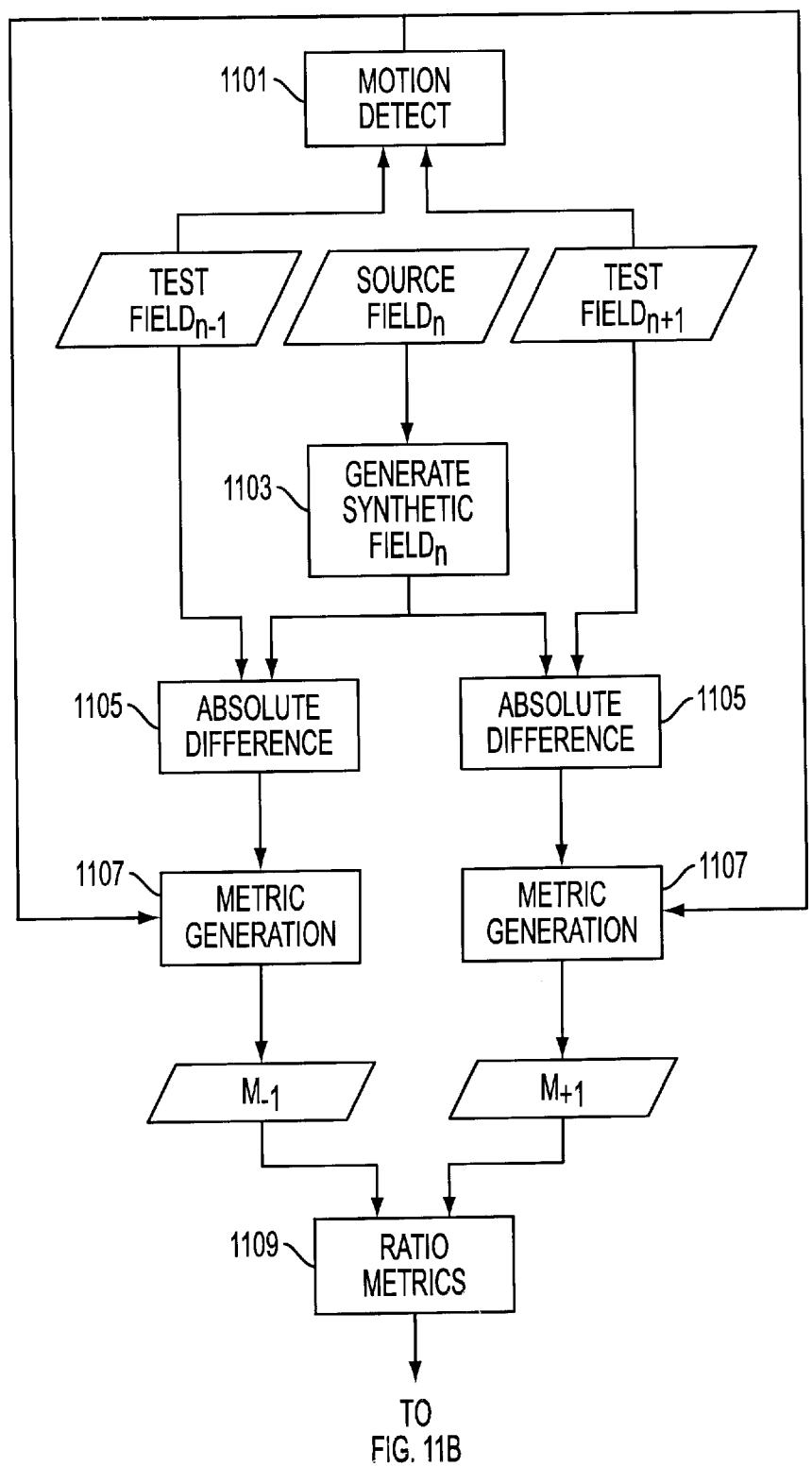
FIGS. 11(a) and 11(b) constitute a flow chart/block diagram of an alternative embodiment of the progressive frame detection system.

Turning now to FIGS. 11(*a*) and 11(*b*), these constitute a flow chart/block diagram of an alternative embodiment of the progressive frame detection system. The input is a source field of imagery, FIELDn, and its two adjacent test fields, FIELDn−1, and FIELDn+1. As with the earlier-described embodiment, this embodiment of the progressive frame detection mechanism operates by determining whether either, neither or both of the adjacent test fields are a suitable progressive time match for the source field. Note that in an area of the material in which the video fields are derived from progressive frame source material (e.g., where telecine processing has taken place), the either and both results are expected. The neither result occurs when the mixed media is not progressive-based (e.g., telecine-generated) material (i.e., it is native video), or when there are edits that occur in the progressive-based material resulting in a field that has no progressive time mate (i.e., a hanging field).

The strategy adopted in this embodiment is to compare the pixels of a video field under consideration with pixels of its immediately adjacent video fields to generate first and second metrics for each pixel. The first and second metrics are indicative of which, if any, of the immediately adjacent video fields is derived from a same progressive frame as the target video field. In this respect, the strategy is the same as in the previously described embodiment. Here, however, instead of looking for striations, the metrics quantify how much motion is represented from one video field to the next. If substantially little motion is detected between all of the pixels in two video fields, then it is very likely that the two video fields were derived from a same progressive frame, especially if the two video fields are known to include representations of motion. By analyzing the set of metrics generated for the video field as a whole, a conclusion can be reached regarding whether one or more progressive frames are present.

It is possible, then, to have embodiments in which entire fields are compared, for the purpose of identifying how much motion is detected from one video field to the next. In order to improve performance, however, an additional step is performed in this embodiment to identify which, if any, pixels within the video field represent motion. This is performed by motion detection logic 1101, which determines the absolute difference between the two immediately adjacent fields (i.e., FIELDn−1 and FIELDn+1) and compares the difference to a motion threshold value. Any pixels exhibiting large differences (i.e., those differences greater than the motion threshold value) are tagged as areas of motion. The reason why the two immediately adjacent fields are compared to one another is because these fields will represent the same scan lines (either all odd or all even), so that they give the best basis for comparison. The combination of these tags forms a motion mask. This motion mask is generated in accordance with the following:

$$\text{Motion\_Mask}[x,y]=1, \text{ if } |\text{FIELDn}-1[x,y]-\text{FIELDn}+1[x,y]|>\text{threshold}=0, \text{ otherwise}$$

In general, it is only the boundaries of objects in motion that will exhibit this behavior and it is this behavior and the resultant image discontinuities that will be exploited in the progressive frame detection strategy.

Having determined which (if any) pixels represent motion, these pixels in the field under consideration (FIELDn) can be compared to each of the same pixels in the immediately preceding video field and also to each of the same pixels in the immediately succeeding video field in order to again determine which, if any, pixels represent motion. If motion is detected between FIELDn−1 and FIELDn, but not between FIELDn and FIELDn+1, then FIELDn+1 is the best progressive match for FIELDn. Conversely, if motion is detected between FIELDn+1 and FIELDn, but not between FIELDn and FIELDn−1, then FIELDn−1 is the best progressive match for FIELDn. The identification of a progressive match is indicative of progressive-based source material (e.g., video generated by means of telecine processing). The absence of any progressive match is indicative of either native video or edited progressive-based video.

It is further recognized that the direct comparison of adjacent fields cannot be relied upon to yield the best results because, by definition, adjacent video fields do not represent exactly the same pixels: one field represents those pixels associated with even scan lines, and the adjacent field represents those pixels associated with odd scan lines. To improve the basis for comparison, a synthetic field, denoted FIELDn', representing the same scan lines as the immediately adjacent fields FIELDn−1 and FIELDn+1, can be generated from the source field, FIELDn, by performing a vertical interpolation. This synthetic field is temporally aligned with FIELDn and spatially aligned with both FIELDn−1 and FIELDn+1. This vertical interpolation can be accomplished by a synthetic field generator 1103 that averages vertical neighboring pixels in the following manner:

$$\text{FIELDn'}[x,y]=(\text{FIELDn}[x,y]+\text{FIELDn}[x,y+1])/2.$$

While vertical resolution is lost in the generation of the synthetic field, this loss has very little impact on the outcome of the progressive frame detection.

Absolute differences between this synthetic field, FIELDn', and each of the adjacent test fields, FIELDn−1, and FIELDn+1, which are now all of the same type (either all even/top or odd/bottom) are generated. These two absolute difference images are generated by one or more absolute difference generation logic units 1105 in accordance with the following:

$$\text{Prev\_Abs\_Diff}:D_{-1}[x,y]=|\text{FIELDn}-1[x,y]-\text{FIELDn'}[x,y]|$$

$$\text{Next\_Abs\_Diff}:D_{+1}[x,y]=|\text{FIELDn}+1[x,y]-\text{FIELDn'}[x,y]|$$

The expected results of these differences are: if an adjacent test field originated from the same progressive frame as the source field, then the only differences will be those that are the result of the loss in vertical resolution. If an adjacent test field is from a different progressive frame (i.e., either they are from different progressive frames prior to conversion to interlace-formatted video, or they are interlaced video and not a product of a progressive-to-interlaced format conversion process), then the differences should be large wherever there is motion, and in particular at the boundaries of objects in motion.

While it would be possible to use the above-described absolute differences as indicators of motion, improved performance is obtained by considering only those pixels known to be representative of motion. Consequently, a metric is computed for each of the adjacent test fields to provide a measure of the presence of progressive frames as follows. The motion detection mask that was generated previously by the large differences between the adjacent test fields is used as a guide as to which pixels are representative of motion, and which will therefore contribute to the generation of the metric. The metric computed at each pixel is preferably the sum of the absolute difference pixels within an N×N neighborhood centered on the pixel for which the corresponding motion mask value is 1. This metric is generated by one or more metric generation logic units 1107 in accordance with the following:

$$\text{Prev\_Metric } M_{-1}[x,y]=\Sigma(\text{Motion\_Mask}[i,j]*D_{-1}[i,j])$$

$$\text{Next\_Metric } M_{+1}[x,y]=\Sigma(\text{Motion\_Mask}[i,j]*D_{+1}[i,j]).$$

where [i,j] are image locations within the N×N box centered about [x,y]. In general, N is related to the smallest size of an object in which motion is to be detected, and will therefore be application-specific. A size of 11×11 has been used with great success over a wide variety of video sequences. It is further noted that for purposes of generating these metrics, the neighborhood around the pixel under consideration need not be square in all embodiments, but may be, for example, rectangular in some embodiments.

The values of the metrics $M_{-1}$ and $M_{+1}$ are not informative when considered independently. Because the synthesized field, FIELDn', is only an estimate of the scan lines not contained in the source field, FIELDn, there are likely to be differences between the synthesized field, FIELDn', and each of its immediately adjacent video fields even if all of the fields are derived from the same progressive film frame. However, if one of the metrics is substantially larger than the other, this is indicative of the video field associated with the smaller metric being a correct progressive match for the source field, FIELDn. Thus, at each pixel location designated by the motion detection mask, the two absolute difference sums are brought together by ratio metric generation logic 1109 to form a ratio in accordance with the following:

$$\text{Ratio}[x,y]=M_{-1}[x,y]/M_{+1}[x-y]$$

The generated ratio metric is then supplied to pixel labeling logic 1111, which operates in accordance with the following. First, a test is performed to detect the special case in which both the numerator and denominator of the ratio metric are zero (decision block 1113). If this is the case ("YES" path out of decision block 1113), the immediately adjacent video fields are the result of the replicated field of 3:2 pulldown (with FIELDn+1 being the replicated field). Both adjacent fields are therefore labeled as a progressive match (step 1115). It is noted that in order for these two metrics to be zero, the threshold applied in the motion detection process must be sufficiently high to ignore the typical noise that occurs in the progressive-to-interlaced conversion (e.g., telecine) processing, yet sufficiently low to detect the differences due to true motion. Testing of this relationship has shown that such a threshold is easily chosen.

If both numerator and denominator of the ratio metric are not equal to zero ("NO" path out of decision block 1113), then the ratio is tested to see if it exceeds an upper threshold, $T_U$ (decision block 1117). The upper threshold $T_U$ may be a value such as 3. If the ratio is greater than the upper threshold ("YES" path out of decision block 1117), then the immediately succeeding video field, FIELDn+1, which provided the denominator for this ratio metric, is determined to be the progressive time field matching the source field at this pixel location, and the immediately succeeding field is labeled as such (step 1119).

If the ratio metric does not exceed the upper threshold, it is then tested to see if it is less than a lower threshold, $T_L$ (decision block 1121). The lower threshold may be a value such as 1/3. If the ratio metric is less than the lower threshold ("YES" path out of decision block 1121), then the immediately preceding video field, FIELDn−1, which provided the numerator for this ratio metric, is deemed to be the progressive time match, and is labeled as such (step 1123).

If the ratio metric lies somewhere between the upper and lower thresholds ("NO" path out of decision block 1121), then neither of the immediately adjacent test fields is considered to be a progressive time match to the source field, indicating either that the mixed media video was not the result of progressive-to-interlaced conversion processing (i.e., it is native video) or else that an edit has occurred. The pixel is therefore labeled to indicate that neither adjacent field is a progressive match (step 1125).

The above-described pixel level labels may be encoded in any of a number of ways. A suitable encoding is as follows:

Label[x,y]=−1: previous adjacent test field is the progressive match

=1: next adjacent test field is the progressive match

=0: neither adjacent test field is the progressive match

=2: both adjacent test field are the progressive match.

Figure 11B:
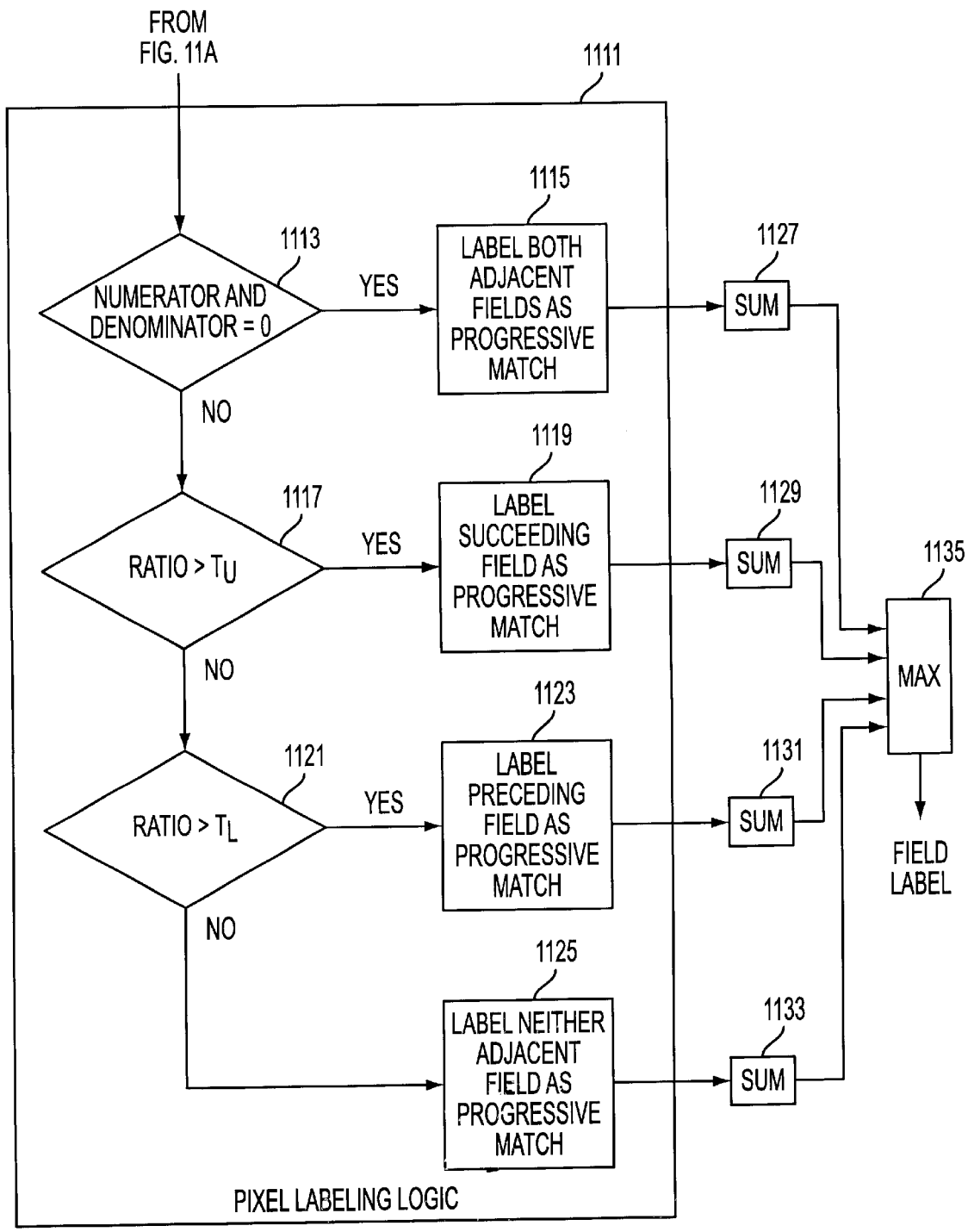

After all of the pixels have been labeled, all of the pixels that are designated by the Motion$_{13}$Mask are tested to generate four sums, each representing a respective count of the number of occurrences of one of the four possible labels. (This is represented in FIG. 11(b) by the four summing units 1127, 1129, 1131 and 1133.) The four sums are supplied to a maximum detector 1135, which identifies which type of pixel had the highest count. The output of the maximum detector 1135 indicates whether one or more progressive frames were detected, based on how the majority of pixels were labeled. The output of the maximum detector 1135 can also be applied to facilitate compression and format conversion applications, since it also provides information about which of the adjacent fields is a progressive match.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, in the above-described embodiments in which numbers of striations are quantified, three video fields at a time are considered: a target video field and its two immediately adjacent (i.e., preceding and succeeding) video fields. However, this is not an essential aspect of the invention. Alternative embodiments can be effected which, for example, consider video fields only two at a time. Furthermore, this can be done be comparing a target video field only with an immediately succeeding video field, or alternatively only with an immediately preceding video field. (The latter approach would require backwards processing of the video source material.)

Furthermore, in the above-described embodiments, inflections and artifact detection indicators are generated for substantially all pixels in a frame comprising the target video field and an immediately adjacent video field. However, this approach is not essential to the invention. For example, one could construct embodiments in which only portions of the entire video fields (target and/or adjacent) are analyzed to identify inflections. As another alternative example, not all pixels that have been identified as being associated with a striation (i.e., artifact) need take part in the generation of the metrics. For example, after having performed a striation analysis, one could derive a metric representing the number of striations only for the target video field. As a result, in various exemplary embodiments, artifact detection and/or striation analysis, and/or metric generation could be performed for a group of target pixels that comprise one or more (e.g., only a portion) of the total number of pixels that make up a target video field.

Thus, the preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of detecting a progressive video frame in a sequence of video fields, wherein the sequence of video fields includes a target video field, the method comprising:

generating an inflection indicator for each of a group of target pixels comprising one or more pixels in the target video field, by comparing each target pixel with at least one neighboring pixel in an immediately preceding video field;

generating an artifact detection indicator for each of one or more of the target pixels, by determining whether a pattern formed by the inflection indicator of the target pixel and the inflection indicators of one or more neighboring pixels matches at least one of one or more artifact-defining patterns;

generating a first metric by combing the artifact detection indicators;

comparing the first metric with a first threshold value; and determining that the immediately preceding video field is derived from a same progressive video frame as the target video field if the first metric is less than the first threshold value.

2. The method of claim 1, further comprising the steps of:

generating a second metric by comparing the target video field with an immediately succeeding video field;

comparing the second metric with a second threshold value; and determining that the immediately succeeding video field is derived from the same progressive video frame as the target video field if the second metric is less than the second threshold value.

3. The method of claim 2, wherein the first and second metrics are each indicative of a quantity of interlace artifacts.

4. The method of claim 2, wherein the first threshold value is equal to the second threshold value.

5. The method of claim 1, wherein the first metric is indicative of a quantity of interlace artifacts.

6. The method of claim 1, wherein the step of generating the artifact detection indicators comprises:
   for each of one or more of the target pixels, performing an artifact detection indicator operation comprising:
   determining whether the target pixel has an inflection;
   if the target pixel has an inflection, determining whether there is a first vertically displace pixel in the line above the target pixel, wherein the first vertically displaced pixel lies either directly in line with the target pixel or else is horizontally displaced by no more than one pixel location from the target pixel, wherein the second vertically displaced pixel lies either directly in line with the target pixel or else in horizontally displaced by no more than one pixel location from the target pixel, and wherein the first and second vertically displaced pixels each have an inflection indicator of the opposite polarity to that of the target pixel;
   if the target pixel has an inflection, determining whether there is a horizontally adjacent pixel having an inflection indicator of the same polarity; and
   if the target pixel has an inflection, determining whether there is not a horizontally adjacent pixel with an inflection indicator of opposite polarity to that of the target pixel.

7. The method of claim 1, wherein the inflection indicator comprises a positive contrast inflection flag and a negative contrast inflection flag that are generated in accordance with:

$$I_+(x,y)=((i(x,y)-i(x,y-1))>+T) \cap ((i(x,y)-i(x,y+1))>+T)$$

$$I_-(x,y)=((i(x,y)-i(x,y-1))<-T) \cap ((i(x,y)-i(x,y+1))<-T)$$

where:
   $I_+(x,y)$ is the positive contrast inflection flag at pixel location (x,y);
   $I_-(x,y)$ is the negative contrast inflection flag at pixel location (x,y);
   i(x,y) is an intensity value at pixel location (x,y); and
   T is an inflection intensity threshold.

8. The method of claim 1, wherein the step of generating the first metric by combing the artifact detection indicators comprises:
   summing the artifact detection indicators.

9. The method of claim 1, wherein the step of the generating the first metric by combining the artifact detection indicators comprises:
   for each of one or more of the target pixels, computing a local average of the artifact detection indicators, whereby a set of local averages is generated; and
   selecting a highest local average from the set of local averages for use as the first metric.

10. A method of detecting a progressive video frame in a sequence of video fields, wherein the sequence of video fields includes a target video field, the method comprising:
    generating an inflection indicator for each of a group of target pixels comprising one or more pixels in the target video field by comparing each target pixel with at least one neighboring pixel in an immediately succeeding video field;
    generating an artifact detection indicator for each of one or more of the target pixels by determining whether a pattern formed by the inflection indicator of the target pixel and the inflection indicators of one or more neighboring pixels matches at least one of one or more artifact-defining patterns;
    generating a metric by combing the artifact detection indicators;
    comparing the metric with a threshold value; and
    determining that the immediately succeeding video field is derived from a same progressive video frame as the target video field if the metric is less than the threshold value.

11. The method of claim 10, wherein the step of generating the artifact detection indicators comprises:
    for each of one or more of the target pixels, performing an artifact detection indication operation comprising:
    determining whether the target pixel has an inflection;
    if the target pixel has an inflection, determining whether there is a first vertically displaced pixel in the line above the target pixel and also a second vertically displaced pixel in the line below the target pixel, wherein the first vertically displaced pixel lies either directly in line with the target pixel or else is horizontally displaced by no more than one pixel location from the target pixel, wherein the second vertically displaced pixel lies either directly in line with the target pixel or else is horizontally displaced by no more than one pixel location from the target pixel, and wherein the first and second vertically displaced pixels each have an inflection indicator of the opposite polarity to that of the target pixel;
    if the target pixel has an inflection, determining whether there is a horizontally adjacent pixel having an inflection indicator of the same polarity; and
    if the target pixel has an inflection, determining whether there is not a horizontally adjacent pixel with an inflection indicator of opposite polarity to that of the target pixel.

12. The method of claim 10, wherein the inflection indicator comprises a positive contrast inflection flag and a negative contrast inflection flag that are generated in accordance with:

$$I_+(x,y)=((i(x,y)-i(x,y-1))>+T) \cap ((i(x,y+1))>+T)$$

$$I_-(x,y)=((i(x,y)-i(x,y-1))<-T) \cap ((i(x,y)-i(x,y+1))<-T)$$

where:
   $I_+(x,y)$ is the positive contrast inflection flag at pixel location (x,y);
   $I_-(x,y)$ is the negative contrast inflection flag at pixel location (x,y);
   i(x,y) is an intensity value at pixel location (x,y); and
   T is an inflection intensity threshold.

13. The method of claim 10, wherein the step of generating the metric by combining the artifact detection indicators comprises:
    summing the artifact detection indicators.

14. The method of claim 10, wherein the step of generating the metric by combining the artifact detection indicators comprises:
    for each of one or more of the target pixels, computing a local average of the artifact detection indicators, whereby a set of local averages is generated; and
    selecting a highest local average from the set of local averages for use as the metric.

15. A method of detecting a progressive video frame in a sequence of video fields, wherein the sequence of video fields includes a target video field, and wherein each of the video fields comprises a plurality of pixels, the method comprising:

for each of a group of target pixels comprising one or more pixels in the target video field, generating a first metric by comparing the target pixel with a corresponding pixel in an immediately preceding video field, whereby a set of first metrics is generated;

for each of the target pixels, generating a second metric by comparing the target pixel with a corresponding pixel in an immediately succeeding video field, whereby a set of second metrics is generated; and using the set of first metrics and the set of second metrics to determine which, if any, of the immediately preceding and immediately succeeding video fields is derived from a same progressive video frame as the target video field, wherein the step of using the set of first metrics and the set of second metrics to determine which, if any, of the immediately preceding and immediately succeeding video fields is derived from the same progressive frame as the target video field comprises:

for each of the target pixels, forming a ratio of the first metric with respect to the second metric, whereby a set of ratios is formed, and wherein each ratio is an indicator of whether none, one or both of the immediately preceding and immediately succeeding video fields are progressive matches to the target video field;

generating a first value that represents how many pixels have a ratio that indicates that none of the immediately preceding and immediately succeeding video fields are progressive matches to the target video field;

generating a second value that represents how many pixels have a ratio that indicates that one of the immediately preceding and immediately succeeding video fields is a progressive match to the target video field;

generating a third value that represents how many pixels have a ratio that indicates that both of the immediately preceding and immediately succeeding video fields are progressive matches to the target video field; and determining which, if any, of the immediately preceding and immediately succeeding video fields is derived from the same progressive frame as the target video field based on which of the first, second, and third values is largest.

16. The method of claim 15, wherein:

for each ratio, the immediately succeeding video field is derived from a same progressive frame as the target video field if the ratio is greater than an upper threshold value;

for each ratio, the immediately preceding video field is derived from the same progressive frame as the target video field if the ratio is less than a lower threshold value; and for each ratio, both the immediately preceding and immediately succeeding video fields are derived from the same progressive frame as the target video field if the first metric and the second metric are both equal to zero.

17. The method of claim 16, wherein further:

for each ratio, neither of the immediately preceding and immediately succeeding video fields are derived from the same progressive frame as the target video field if the ratio is both greater than the lower threshold value and less than the upper threshold value.

18. A method of detecting a progressive video frame in a sequence of video fields, wherein the sequence of video fields includes a target video field, and wherein each of the video fields comprises a plurality of pixel, the method comprising:

for each of a group of target pixels comprising one or more pixels in the target video field, generating a first metric by comparing the target pixel with a corresponding pixel in an immediately preceding video field, whereby a set of first metrics is generated;

the first metric is determined in accordance with:

$$D_{-1}[x,y]=|\text{FIELD}n{-}1[x,y]-\text{FIELD}n[x,y]|; \text{ and}$$

for each of the target pixels, generating a second metric by comparing the target pixel with a corresponding pixel in an immediately succeeding video field, whereby a set of second metrics is generated:

the second metric is determined in accordance with:

$$D_{+1}[x,y]=|\text{FIELD}n{+}1[x,y]-\text{FIELD}n[x,y]|,$$

and wherein:

FIELDn[x,y] is a pixel located at location x,y in the synthesized target video field;

FIELDn−1[x,y] is a pixel located at location x,y in the immediately preceding video field and;

FIELDn+1[x,y] is a pixel located at location x,y in the immediately succeeding video filed;

using the set of first metrics and the set of second metrics to determine which, if any, of the immediately preceding and immediately succeeding video fields is derived from a same progressive video frame as target video field; and synthesizing the target video field by interpolating vertically aligned pixels in a source video field that is between the immediately preceding and immediately succeeding video fields.

19. An apparatus for detecting a progressive video frame in a sequence of video fields, wherein the sequence of video fields includes a target video field, the apparatus comprising:

logic that, for each of a group of target pixels comprising one or more pixels in the target video field, generates an inflection indicator by comparing the target pixel with at least one neighboring pixel in the immediately preceding video field;

logic that, for each of one or more of the target pixels, generates and artifact detection indicator by determining whether a pattern formed by the inflection indicator of the target pixel and the inflection indicators of one or more neighboring pixels matches at least one of one or more artifact-defining patterns;

logic that generates a first metric by combing the artifact detection indicators;

logic that compares the first metric with a first threshold value; and logic that determines that the immediately preceding video field is derived from a same progressive video frame as the target video field if the first metric is less than the first threshold value.

20. The apparatus of claim 19, further comprising:
   logic that generates a second metric by comparing the target video field with an immediately succeeding video field;
   logic that compares the second metric with a second threshold value; and
   logic that determines that the immediately succeeding video field is derived from the same progressive video frame as the target video field if the second metric is less than the second threshold value.

21. The apparatus of claim 20, wherein the first and second metrics are each indicative of a quantity of interlace artifacts.

22. The apparatus of claim 20, wherein the first threshold value is equal to the second threshold value.

23. The apparatus of claim 19, wherein the first metric is indicative of a quantity of interlace artifacts.

24. The apparatus of claim 19, wherein the logic that generates the artifact detection indicators comprises:
   logic that, for each of one or more of the target pixels, performs an artifact detection indicator operation comprising:
      determining whether the target pixel has an inflection;
      if the target pixel has an inflection, determining whether there is a first vertically displaced pixel in the line above the target pixel, wherein the first vertically displaced pixel lies either directly in line with the target pixel or else is horizontally displaced by no more than one pixel location from the target pixel, wherein the second vertically displaced pixel lies either directly in line with the target pixel or else is horizontally displaced by no more than one pixel location from the target pixel, and wherein the first and second vertically displaced pixels each have an inflection indicator of the opposite polarity to that of the target pixel;
      if the target pixel has an inflection, determining whether there is a horizontally adjacent pixel having an inflection indicator of the same polarity, and
      if the target pixel has an inflection, determining whether there is not a horizontally adjacent pixel with an inflection indicator of opposite polarity to that of the target pixel.

25. The apparatus of claim 19, wherein the inflection indicator comprises a positive contrast inflection flag and a negative contrast inflection flag that are generated in accordance with:

$$I_+(x,y)=((i(x,y)-i(x,y-1))>+T) \cap ((i(x,y)-i(x,y+1))>+T)$$

$$I_-(x,y)+((i(x,y)-i(x,y-1))<-T) \cap ((i(x,y)-i(x,y+1))<-T)$$

where:
   $I_+(x,y)$ is the positive contrast inflection flag at pixel location (x,y);
   $I_-(x,y)$ is the negative contrast inflection flag at pixel location (x,y);
   $i(x,y)$ is an intensity value at pixel location (x,y); and
   T is an inflection intensity threshold.

26. The apparatus of claim 19, wherein the logic that generates the first metric by combining the artifact detection indicators comprises:
   logic that sums the artifact detection indicators.

27. The apparatus of claim 19, wherein the logic that generates the first metric by combining the artifact detection indicators comprises:
   logic that, for each of one or more of the target pixels, computes a local average of the artifact detection indicators, whereby a set of local averages is generated; and
   logic that selects a highest local average from the set of local averages for use as the first metric.

28. An apparatus for detecting a progressive video frame in a sequence of video fields, wherein the sequence of video fields includes a target video field, the apparatus comprising:
   logic that, for each group of target pixels comprising one or more pixels in the target video field, generates an inflection indicator by comparing the target pixel with at least one neighboring pixel in the immediately succeeding video field;
   logic that, for each of one or more of the target pixels, generates an artifact detection indicator by determining whether a pattern formed by the inflection indicator of the target pixel and the inflection indicators of one or more neighboring pixels matches at least one of one or more artifact-defining patterns;
   logic that generates a metric by combining the artifact detection indicators;
   logic that compares the metric with a threshold value; and
   logic that determines that the immediately succeeding video field is derived from a same progressive video frame as the target video field if the metric is less than the threshold value.

29. The apparatus in claim 28, wherein the logic that generates the artifact detection indicators comprises:
   logic that, for each of one or more of the target pixels, performs an artifact detection indication operation comprising:
      determining whether the target pixel has an inflection;
      if the target pixel has an inflection, determining whether there is a first vertically displaced pixel in the line above the target pixel and also a second vertically displaced pixel in the line below the target pixel, wherein the first vertically displaced pixel lies either directly in line with the target pixel or else is horizontally displaced by no more than one pixel location from the target pixel, wherein the second vertically displaced pixel lies either directly in line with the target pixel or else is horizontally displaced by no more than one pixel location from the target pixel, and wherein the first and second vertically displaced pixels each have an inflection indicator of the opposite polarity to that of the target pixel;
      if the target pixel has an inflection, determining whether there is a horizontally adjacent pixel having an inflection indicator of the same polarity; and
      if the target pixel has an inflection, determining whether there is not a horizontally adjacent pixel with an inflection indicator of opposite polarity to that of the target pixel.

30. The apparatus of claim 28, wherein the inflection indicator comprises a positive contrast inflection flag and a negative contrast inflection flag that are generated in accordance with:

$$I_+(x,y)=((i(x,y)-i(x,y-1))>+T) \cap ((i(x,y)-i(x,y+1))>+T$$

$$I_-(x,y)+((i(x,y)-i(x,y-1))<-T) \cap ((i(x,y)-i(x,y+1))<-T)$$

where:
   $I_+(x,y)$ is the positive contrast inflection flag at pixel location (x,y);
   $I_-(x,y)$ is the negative contrast inflection flag at pixel location (x,y);

i(x,y) is an intensity value at pixel location (x,y); and

T is an inflection intensity threshold.

31. The apparatus of claim 28, wherein the logic that generates the metric by combining the artifact detection indicators comprises:

logic that sums the artifact detection indicators.

32. The apparatus of claim 28, wherein the logic that generates the metric by combining the artifact detection indicators comprises:

logic that, for each of one or more of the target pixels, computes a local average of the artifact detection indicators, whereby a set of local averages is generated; and logic that selects a highest local average from the set of local averages for use as the metric.

33. An apparatus for detecting a progressive video frame in a sequence of video fields, wherein the sequence of video fields includes a target video field, and wherein each of the video fields comprises a plurality of pixels, the apparatus comprising:

logic that, for each of a group of target pixels comprising one or more pixels in the target video field, generates a first metric by comparing the target pixel with a corresponding pixel in an immediately succeeding video field, whereby a set of second metrics is generated; and logic that uses the set of first metrics and the set of second metrics to determine which, if any, of the immediately preceding and immediately succeeding video fields is derived from a same progressive video frame as the target video field, wherein the logic that uses the set of first metrics and the set of second metrics to determine which, if any of the immediately preceding and immediately succeeding video fields is derived from the same progressive frame as the target video field comprises:

logic that, for each of the target pixels, forms a ratio of the first metric with respect to the second metric, whereby a set of ratios is formed, and wherein each ratio is an indicator of whether none, one or both of the immediately preceding and immediately succeeding video fields are progressive matches to the target video field;

logic that generates a first value that represents how many pixels have a ration that indicates that none of the immediately preceding and immediately succeeding video fields are progressive matches to the target video field;

logic that generates a second value that represents how many pixels have a ration that indicates that one of the immediately preceding and immediately succeeding video fields are progressive matches to the target video field; and logic that determines which, if any, of the immediately preceding and immediately succeeding video fields is derived from the same progressive frame as the target video field based on which of the first, second, and third values is largest.

34. The apparatus of claim 33, wherein:

for each ratio, the immediately succeeding video field is derived from a same progressive frame as the target video field if the ratio is greater than an upper threshold value;

for each ratio, the immediately preceding video field is derived from the same progressive frame as the target video field if the ratio is less than a lower threshold value; and for each ratio, both the immediately preceding and immediately succeeding video fields are derived from the same progressive frame as the target video field if the first metric and the second metric are both equal to zero.

35. The apparatus of claim 34, wherein further:

for each ratio, neither of the immediately preceding and immediately succeeding video fields are derived from the same progressive frame as the target video field if the ratio is both greater than the lower threshold value and less than the upper threshold value.

36. An apparatus for detecting a progressive video frame in a sequence of video fields, wherein the sequence of video fields includes a target video field, and wherein each of the video fields comprises a plurality of pixels, the apparatus comprising:

logic that, for each of a group of target pixels comprising one or more pixels in the target video filed, generates a first metric by comparing the target pixel with a corresponding pixel in an immediately preceding video field, whereby a set of first metrics is generated, and wherein:

the first metric is determined in accordance with:

$D_{-1}[x,y] = |FIELDn-1[x,y] - FIELDn'[x,y]|$; and wherein:

logic that, for each of the target pixels, generates a second metric by comparing the target pixel with a corresponding pixel in an immediately succeeding video field, whereby a set of second metrics is generated and wherein;

$D_{+1}[x,y] = |FIELD+1[x,y] - FIELDn'[x,y]|$, and wherein;

FIELDn'[x,y] is a pixel located at location x,y in the synthesized target video field;

FIELDn−1[x,y] is a pixel located at location x,y in the immediately preceding video field; and FIELDn+1[x,y] is a pixel located at location x,y in the immediately succeeding video field;

logic that uses the set of first metrics and the set of second metrics to determine which, if any, of the immediately preceding and immediately succeeding video fields is derived from a same progressive video frame as the target video field; and logic that synthesizes the target video field by interpolating vertically aligned pixels in a source video field that is between the immediately preceding and immediately succeeding video fields.

* * * * *